United States Patent
Hata et al.

(10) Patent No.: US 6,945,717 B2
(45) Date of Patent: Sep. 20, 2005

(54) PRINTER, PRINTER SYSTEM, PRINTER CONTROL METHOD, AND PROGRAM THEREFOR

(75) Inventors: Hisao Hata, Tokyo (JP); Hirotake Watanabe, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/477,608

(22) PCT Filed: May 15, 2001

(86) PCT No.: PCT/JP01/04053

§ 371 (c)(1),
(2), (4) Date: Feb. 17, 2004

(87) PCT Pub. No.: WO02/092350

PCT Pub. Date: Nov. 21, 2002

(65) Prior Publication Data

US 2004/0146327 A1 Jul. 29, 2004

(51) Int. Cl.[7] .............................................. B41J 11/44
(52) U.S. Cl. .............................. 400/76; 400/61; 400/70
(58) Field of Search ............................... 400/61, 70, 76

(56) References Cited

U.S. PATENT DOCUMENTS

2001/0014237 A1 * 8/2001 Shima ........................ 400/61

FOREIGN PATENT DOCUMENTS

| JP | A 60-176168 | 9/1985 |
|----|-------------|--------|
| JP | A 02-121022 | 5/1990 |
| JP | A 02-257762 | 10/1990 |
| JP | A 05-265671 | 10/1993 |
| JP | A 10-285378 | 10/1998 |
| JP | A 11-191055 | 7/1999 |
| JP | A 11-259484 | 9/1999 |

* cited by examiner

Primary Examiner—Charles H. Nolan, Jr.
(74) Attorney, Agent, or Firm—Oliff & Berridge, PLC

(57) ABSTRACT

A controller (4) for controlling a printer engine (7) used to print data on a medium determines an identification number based on received data, and prints the identification number together with print data based on the received data on the medium. Simultaneously, the controller (4) stores therein the identification number and the print data in an HD (6). With the construction, the identification number printed on the medium is inputted in the next and later printing operations. The controller (4) searches the HD (6) to retrieve and print the print data. Therefore, a copy of a quality as high as that of the original document can be produced.

23 Claims, 26 Drawing Sheets

DATA IN NUMBERING REGION IS READ, INCREMENTED BY +1 AND THEN SAVED IN THE SAME REGION

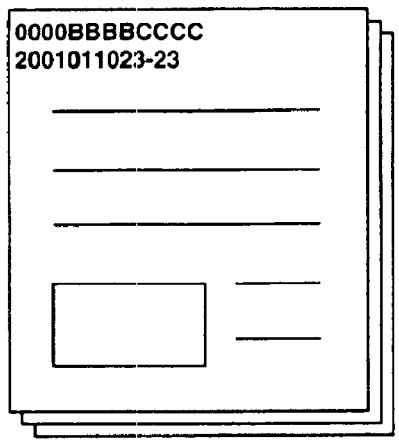
DOCUMENT A
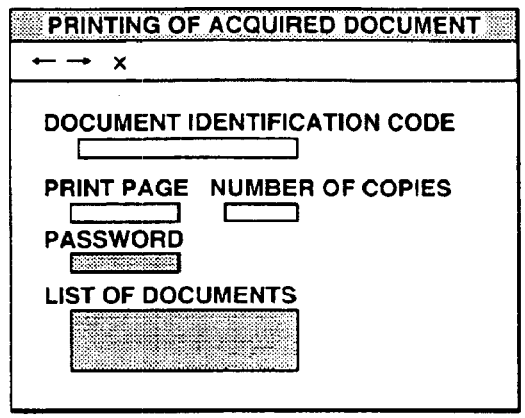
DOCUMENT REPRINT REQUEST
SCREEN (WEB BROWSER)
FIG.33
| | | LIST OF PRINT DOCUMENTS | | |
|---|---|---|---|---|
| FILE NAME | PRINT DATE AND TIME | DOCUMENT IDENTIFICATION CODE | | PASSWORD |
| syorui1.txt | 01/03/02 12:00:23 | 0CKEJ345_ | | PAJS43 |
| syorui2.txt | 01/03/02 12:24:26 | 0CKEJ335_ | | PARYN3 |
| syorui3.txt | 01/03/02 06:36:28 | 0CKEJ386_ | | RHHS43 |
| syorui4.txt | 01/03/03 11:00:23 | 0CKEJ307_ | | HRYS43 |
| syorui5.txt | 01/03/04 09:00:23 | 0CKEJ334_ | | PARTJ3 |
| syorui6.txt | 01/03/10 05:55:23 | 0CKEJ375_ | | PAYGH3 |
LIST OF DOCUMENTS
FIG.34

PRINTER, PRINTER SYSTEM, PRINTER CONTROL METHOD, AND PROGRAM THEREFOR

TECHNICAL FIELD

The present invention relates to a printer that performs management and retrieval of printed documents, to a printer system, printer control method, and program therefor, and, more particularly, to a printer for facilitating document re-printing, a printer system, a printer control method, and a program therefor.

BACKGROUND ART

Printers that receive computer electronic data and print same on a sheet are widely used as computer output devices. Sometimes printed material that has been printed by such printers is viewed and then the printed material on hand is duplicated. Generally, a method that involves duplicating the printed material by means of a photocopier is used. However, a method that optically reads and duplicates the printed material results in a deterioration of the quality of the printed material. This tendency becomes more prominent as the number of copies of the same printed material increases.

For this reason, a method that involves obtaining the original electronic data for the printed material and then re-printing same has been used. With this method, because the electronic data does not deteriorate, no deterioration in the quality of the printed material is produced irrespective of the number of duplicates.

Conventionally, the following methods are known as such methods.

(1) Where the document creator himself/herself is concerned, the electronic data can be easily printed by means of a printer. However, if the document creator is somebody else, either a request is made to the document creator in order to obtain the data or the document creator is asked to perform the printing.

(2) Further, a standalone device carries and utilizes a function for reprinting a document from a document identification number. For example, Japanese Patent Application Laid Open No. S60-176168 discloses that a file number for a created document is printed on a printed material, the document is searched under the file number, and reprinting is performed.

Furthermore, Japanese Patent Application Laid Open No. 2-257762 discloses that, in a digital photocopier, a file number is automatically assigned to render a document file when the document is read and, by printing a list of the file numbers separately from the printed material, the corresponding file number is sought from the list, the document file is retrieved, and the retrieved document is reprinted.

(3) As shown in FIG. 14, documents are managed by a server which is accessed by clients to retrieve a document and the retrieved document is reprinted by a printer.

However, when data is obtained, by means of the method in (1), software that is the same as the application whereby the original document was created, or software that enables data to be read and printed is required, as shown in FIG. 14.

In addition, when the document creator is asked to perform printing, depending on the case, the identity of the document creator is checked and the creator is asked to perform printing. The document creator who has been asked to perform printing is required to carry out a troublesome task that involves searching for the document file, running an application to open and print the document file, and passing the printed document copy(ies) to the party requesting the copies.

The method in (2) employs a special device for filing documents (a word processor, electronic file copier), and, because this method is restricted to usage of a special device, other general purpose devices cannot be used. For example, when the party requesting the copies other than the document creator uses a general-purpose personal computer, it is difficult to perform reprinting via a network such as a LAN (Local Area Network).

Because, with the method in (3), usage of the server is shared by clients, document managers and creators and so forth are required to perform the task of associating the document files and printed material after managing non-duplicate numbers and so forth. Further, as shown in FIG. 35, when a document file search is performed, the party concerned is required to run his/her own personal computer (client) to search for a document file in the server. In addition, when printing is performed, there is then the troublesome labor of downloading data in the server to the client, and running an application to open and print the document file. More particularly, in the case of an application where the format of the original document is not installed on his or her own personal computer, there are costs and labor involved in purchasing and installing the application, and so forth.

In other words, the content must be confirmed to establish whether the printed material on hand and the document file stored in the server are actually the same.

DISCLOSURE OF THE INVENTION

Therefore, an object of the present invention is to provide a printer for reducing the troublesome work involved in obtaining duplicates of printed material by means of a general-purpose device, as well as a printer system, a printer control method, and a program thereof.

Further, another object of the present invention is to provide a printer for performing document management of and retrieval of printed material easily by means of a printer that prints electronic data via a client, as well as a printer system, a printer control method and a program thereof.

Yet another object of the present invention is to provide a printer that performs document management of received electronic data and renders a document search straightforward, as well as a printer system, a printer control method, and a program thereof.

In order to achieve the above objects, according to the present invention, a printer comprises a printer engine that performs printing on the medium; a storage unit that stores print data on the basis of the received data together with an identification number; and a controller for controlling the printer engine to print the received data. Further, the controller determines the identification number for the received data, controls the printer engine to print the received data and the identification number, and stores print data on the basis of the received data together with the identification number in the storage unit; and retrieves the print data of the identification number from the storage unit in response to designation of the identification number, and controls the printer engine to print the print data thus retrieved.

According to the present invention, because, when the printer is instructed to perform printing, an identification number is automatically printed on the printed material and the print data is stored, where printed material that is printed with an identification number is concerned, even if the document creator is unknown and does not know where the data is, anyone is able to easily print duplicates that are identical to the original document without any deterioration in quality without relying on a personal computer and an application, and so forth.

Moreover, it is possible to print duplicates by means of a simple operation that involves simply inputting an identification number via the printer operator panel or a host, and therefore the same work can be performed more simply than by copying and in a short time, and more attractive printed material can be obtained.

In addition, because printing can be performed simply by means of an identification number from the host, the time taken for the running of an application, a document opening operation, the opening of print data by means of a driver, and for the data transfer is shortened, whereby the work rate can be increased.

Further, according to the present invention, it is preferable that the controller determines the identification number for received data for which the assignment of an identification number is designated from outside, controls the printer engine to print the received data and the identification number, and stores print data on the basis of the received data together with the identification number in the storage unit. As a result, at the time printing by the printer is requested, it is possible to control the requirement or non-requirement for document management from outside and to control the document management by the printer.

In addition, according to the present invention, it is preferable that the controller determines the identification number from a device specific value and a serial number or a print time, whereby duplication of identification numbers between documents and between devices can be prevented.

Moreover, according to the present invention, it is possible to instruct document duplication by means of a printer device by further providing designating means for designating the identification number.

Moreover, according to the present invention, it is preferable that the controller detects a fact that the print data corresponding with the identification number is not stored in the storage unit, issues an inquiry regarding print data that corresponds with the identification number to another network-connected device, and performs printing by acquiring the print data from the another device. As a result, in a network-connected printer system, documents retained by the system can be duplicated by means of a designated printer.

BRIEF DESCRIPTION OF THE DRAWINGS

FIG. 33 is an explanatory view of the document reprint request screen of FIG. 29;

FIG. 34 is an explanatory view of the fifth embodiment of the present invention.

BEST MODE FOR CARRYING OUT THE INVENTION

Embodiments of the present invention will be described hereinbelow in the order: first embodiment, second embodiment, third embodiment, fourth embodiment, and other embodiments.

[First Embodiment]

Figure 1:
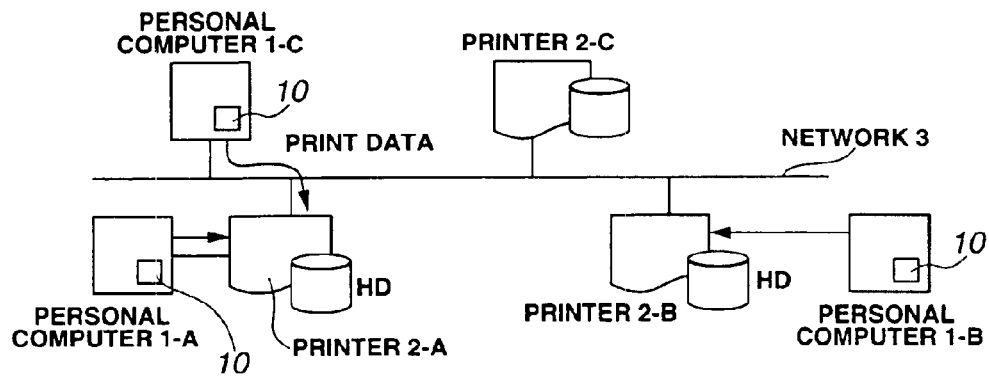
FIG. 1 is a system constitutional view of a first embodiment of the present invention.
Figure 2:
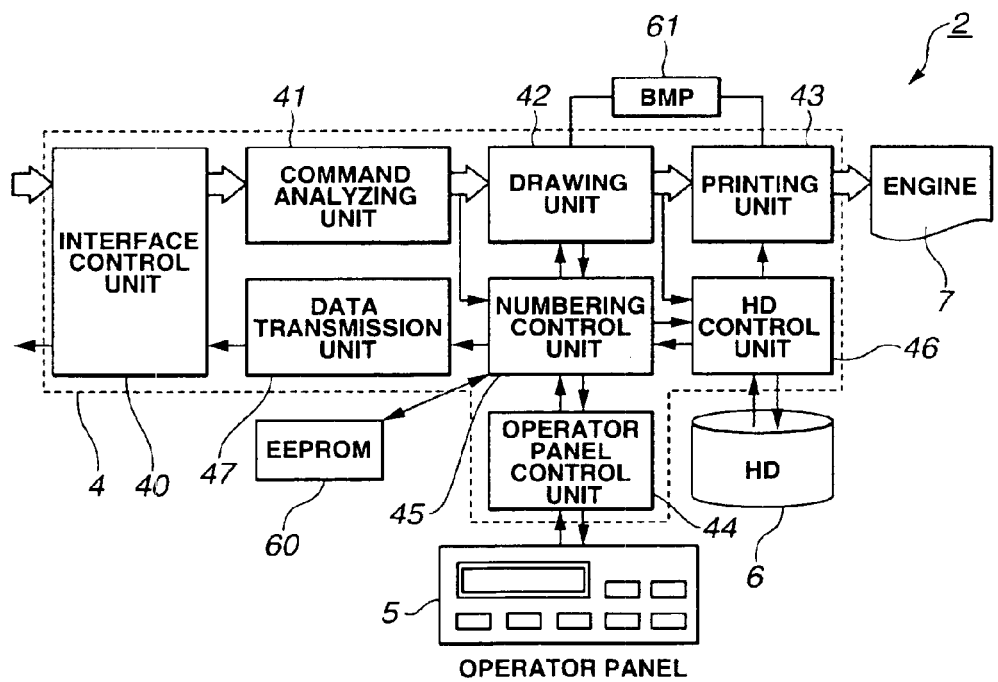
FIG. 2 is a block diagram of the printer in FIG. 1.
Figure 3:
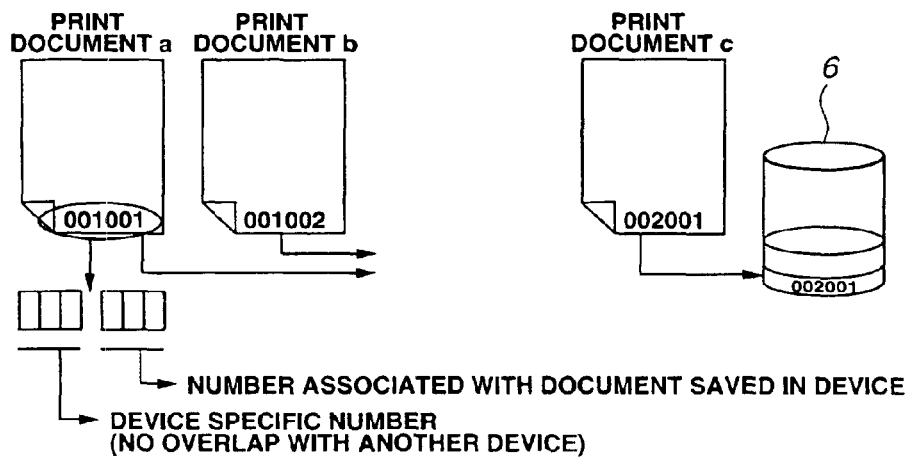
FIG. 3 is an explanatory view of the document management of the printer in FIG. 1.
Figure 4:
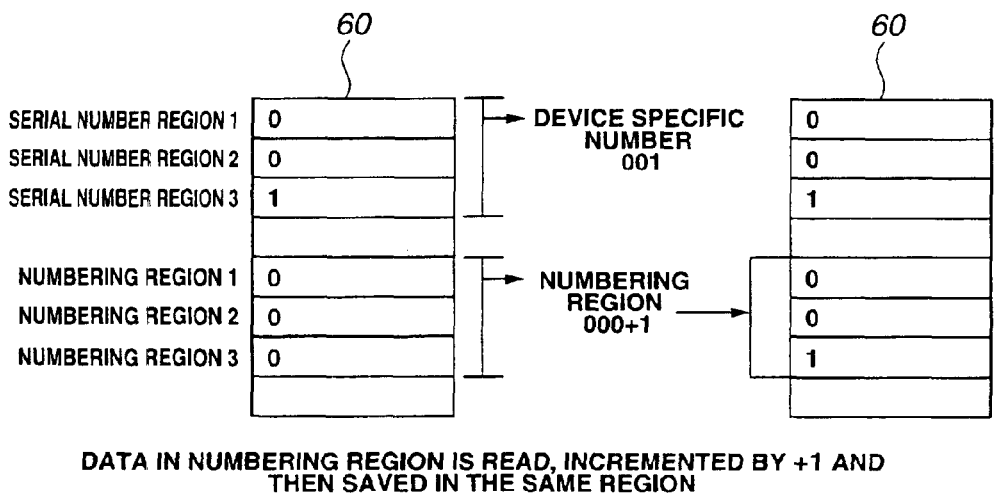
FIG. 4 is an explanatory view of the document management numbers of the printer in FIG. 1.
Figure 5:
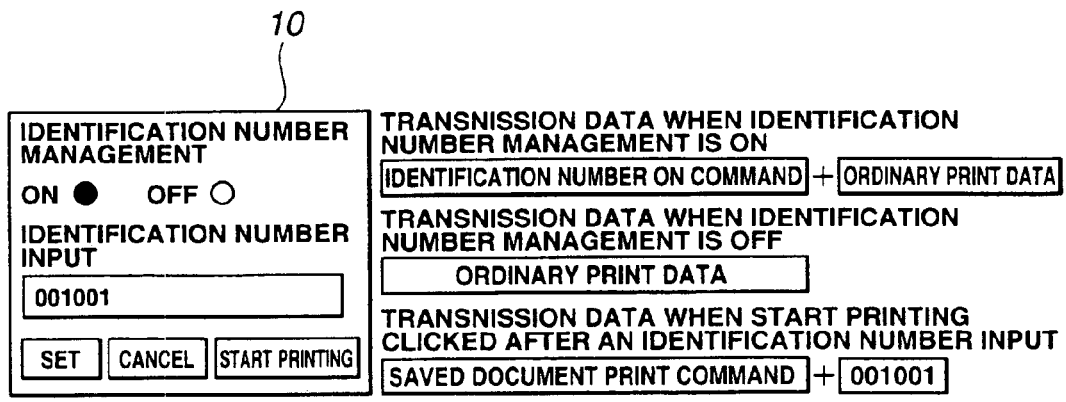
FIG. 5 is an explanatory view of a printer driver that designates document management of the printer in the personal computer of FIG. 1.
Figure 6:
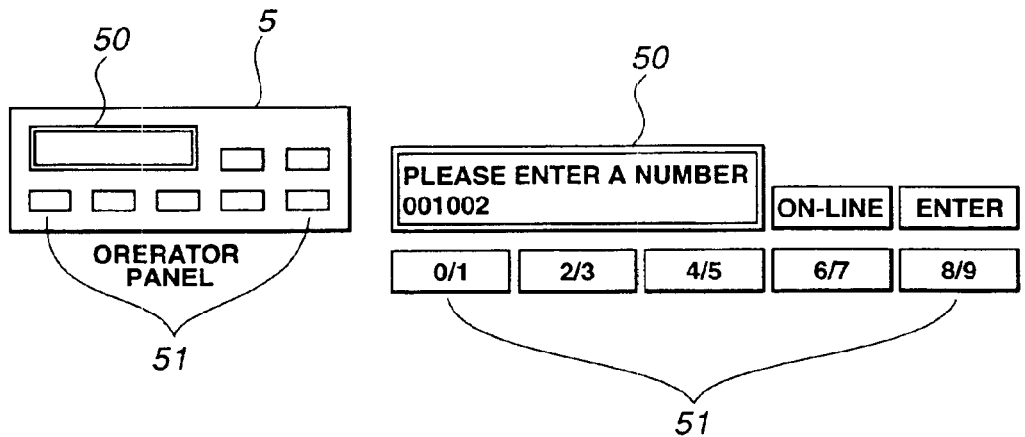
FIG. 6 is an explanatory view of the operator panel of the printer in FIG. 1.

FIG. 1 is a constitutional view of the printer system of the first embodiment of the present invention; FIG. 2 is a block diagram of the printer in FIG. 1; FIG. 3 is an explanatory view of the document management of the printer in FIG. 1; FIG. 4 is an explanatory view of the document management number of the printer in FIG. 1; FIG. 5 is an explanatory view of the printer driver that designates the document management of the printer by means of the personal computer in FIG. 1; and FIG. 6 is an explanatory view of the operator panel of the printer in FIG. 1.

As shown in FIG. 1, a personal computer (PC) 1-C, and printers 2-A, 2-B, and 2-C are connected to a network 3 such as a LAN (Local Area Network). Further, personal computers 1-A and 1-B are connected to the printers 2-A and 2-B.

The personal computer 1-C is able to use any of the three printers 2-A, 2-B, and 2-C via the network 3. The personal computers 1-A and 1-B are able to use the printers 2-A and 2-B. Further, communication between the printers 2-A, 2-B, and 2-C via the network 3 is possible. The personal computers 1-A, 1-B, and 1-C are each provided with a printer driver 10. The printers 2-A, 2-B, and 2-C comprise a large capacity storage device HD.

The printers 2 (2-A, 2-B, and 2-C) print print data on a sheet in accordance with print commands of the personal computer. The constitution of the printers 2 will now be described by means of FIG. 2. As shown in FIG. 2, the printers 2 are each constituted by a controller 4, an operator panel 5, a large-capacity storage device 6, and a printer engine 7.

The controller 4 is constituted by a single or a plurality of processors, a memory, and a peripheral circuit. The functions of the controller 4 are described in blocks 40 to 46. An interface control unit 40 communicates with a host such as a personal computer. A command analyzing unit 41 analyzes data received by way of a pair of host interfaces and divides this data into print data and commands. The command analyzing unit 41 performs a print operation via a drawing unit 42 and a printing unit 43 in the case of print data and performs designated command processing in the case of a command.

The drawing unit 42 generates image data from print data and performs drawing in a bitmap memory 61. The printing unit 43 controls the printer engine 7 so as to allow the printer engine 7 to print the image data in the bitmap memory 61. The printer engine 7 is constituted by a page printer such as an electronic photocopier.

When the operator wishes to perform printing by obtaining an identification number, identification number management is set by placing a check mark against ON via the printer property screen of the printer driver 10 installed on the personal computer 1, as shown in FIG. 5. When identification number management is set to ON, the printer driver 10 transmits an identification number ON command to the printer 2 and then transmits ordinary print data.

Returning to FIG. 2, when the printer 2 receives the identification number ON command for the print document, the command analyzing unit 41 notifies a numbering control unit 45 that this is data to be identified. Further, upon receiving the print data, the command analyzing unit 41 notifies the numbering control unit 45 that the print data has been received and transfers the print data to the drawing unit 42.

The numbering control unit 45 accesses the numbering region of a nonvolatile memory EEPROM 60 in accordance with the identification number ON command, and thus acquires the saved numbering value. As shown in FIG. 4, each time the identification number ON command is received, the numbering control unit 45 increments this value and then matches same with the received print data. That is, the numbering control unit 45 increments the value thus read from the EEPROM 60 by "+1" and then writes the incremented value to the same region.

The numbering control unit 45 newly determines the identification number by reading the device specific value from the region of the EEPROM 60 on which the device serial number has been saved and adding the acquired numbering value.

The drawing unit 42 requests the identification number from the numbering control unit 45, adds the acquired identification number to the ordinary print data, opens the data in the bitmap memory 61, and then transfers the data to the print control unit 43 to perform printing. For example, as shown in FIG. 3, the identification number "001001" is printed on the print document a, while the identification number "001002" is printed on the other print document b.

At the same time, the drawing unit 42 transmits the identification number and the print data to a HD control unit 46 on the basis of the instruction from the numbering control unit 45. The HD control unit 46 controls the read/write of the large-capacity storage device 6 that is constituted by a hard disk drive (HD). The HD control unit 46 saves the identification number and the print data (data prior to bitmap opening or data after bitmap opening) in the HD6. For example, as shown in FIG. 3, the identification number "002001" and the print data are stored in the HD6 for the print document C. In the case of data prior to bitmap opening, this data is stored as is, whereas bitmap data is stored after undergoing data compression.

The operator panel 5 is operated by the operator and displays printer states and so forth, and comprises a display unit 50 and various switches 51, as shown in FIG. 6. An operator panel control unit 44 controls the input/output of the operator panel 5. When an identification number is entered via the operator panel 5, the number thus input is transferred to the numbering control unit 45 by the operator panel control unit 44. Further, printing from the host entails inputting the number in printer properties and inputting a printing start. The printer driver 10 outputs the number thus input and the saved document print command to the printer 2.

The printer 2 transfers the number thus received via the I/F 40 to the numbering control unit 45. Having received the identification number, the numbering control unit 45 searches the HD6 via the HD control unit 46 for a document which corresponds with the inputted number, and, if a corresponding document is present, transfers the print data to the printing unit 43 for printing. Further, as will be described subsequently, in the absence of such a document in the HD6 within the device 2, the numbering control unit 45 transmits a document information inquiry command to another device to obtain the corresponding document.

Each of the blocks 40 to 46 of the printer 2 can be implemented by a program but may be partially implemented by hardware.

Figure 7:
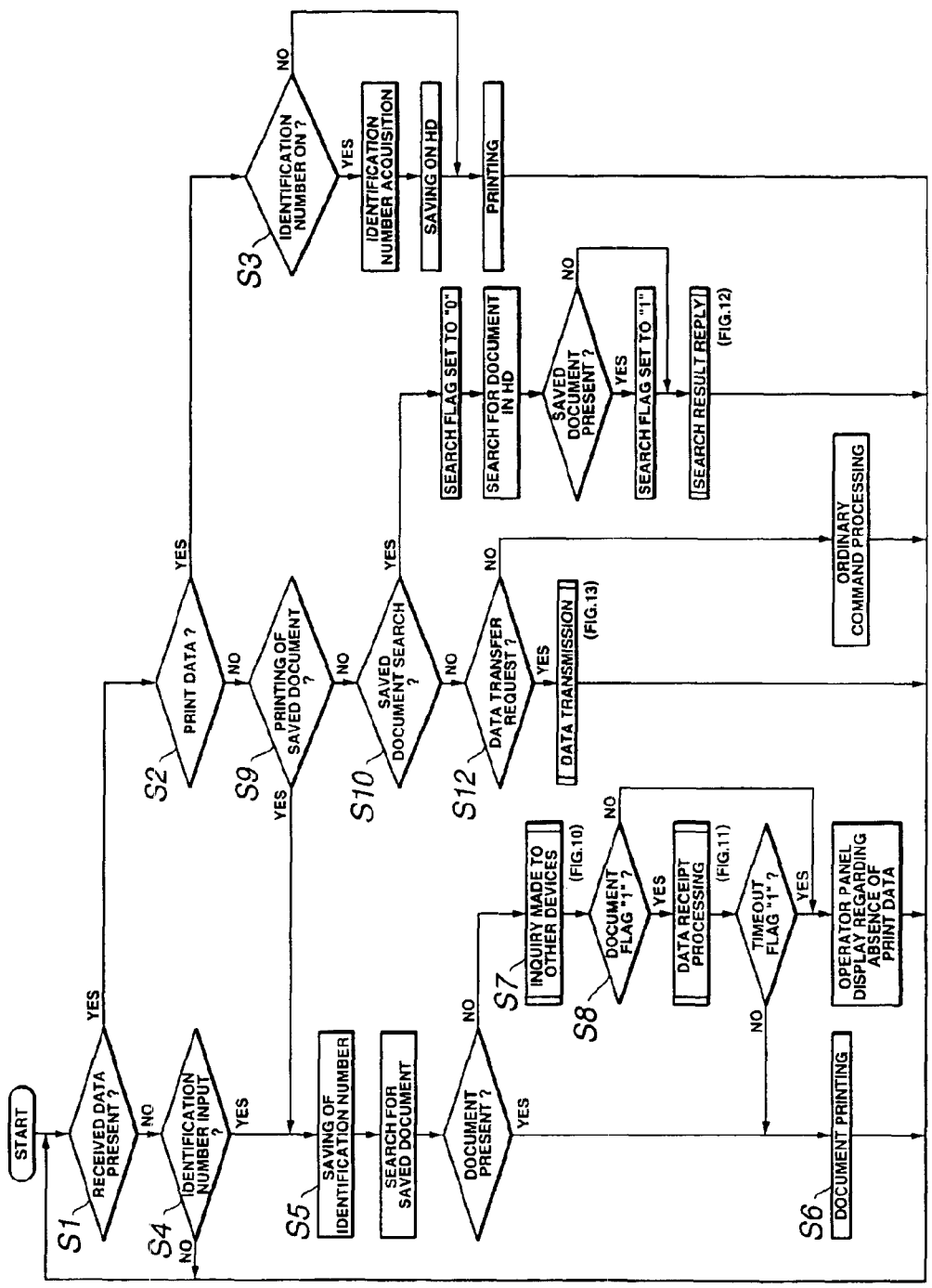
FIG. 7 is a flowchart for the control of the printer in FIG. 2.
Figure 8:
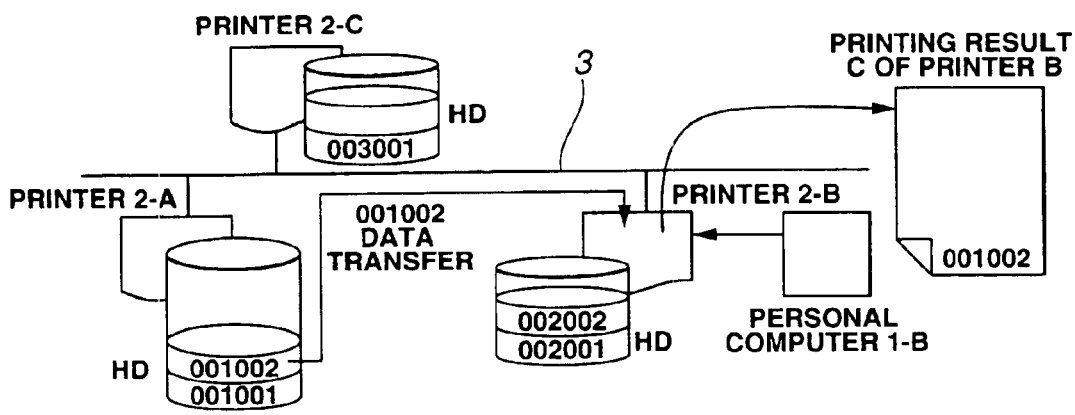
FIG. 8 is an explanatory view of the search operation by the printer in FIG. 1.
Figure 9:
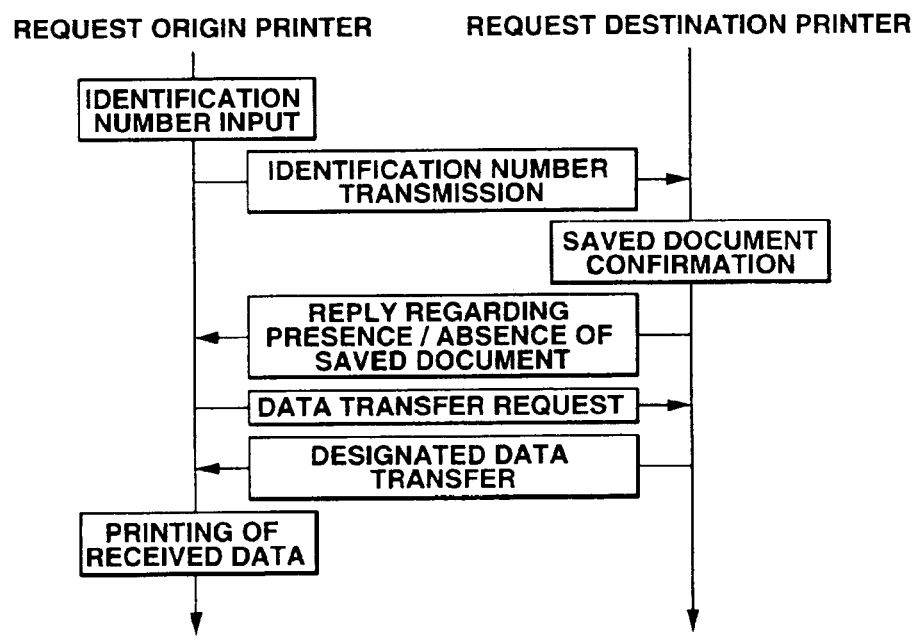
FIG. 9 is an explanatory view of the protocol used between the printers in FIG. 8.
Figure 10:
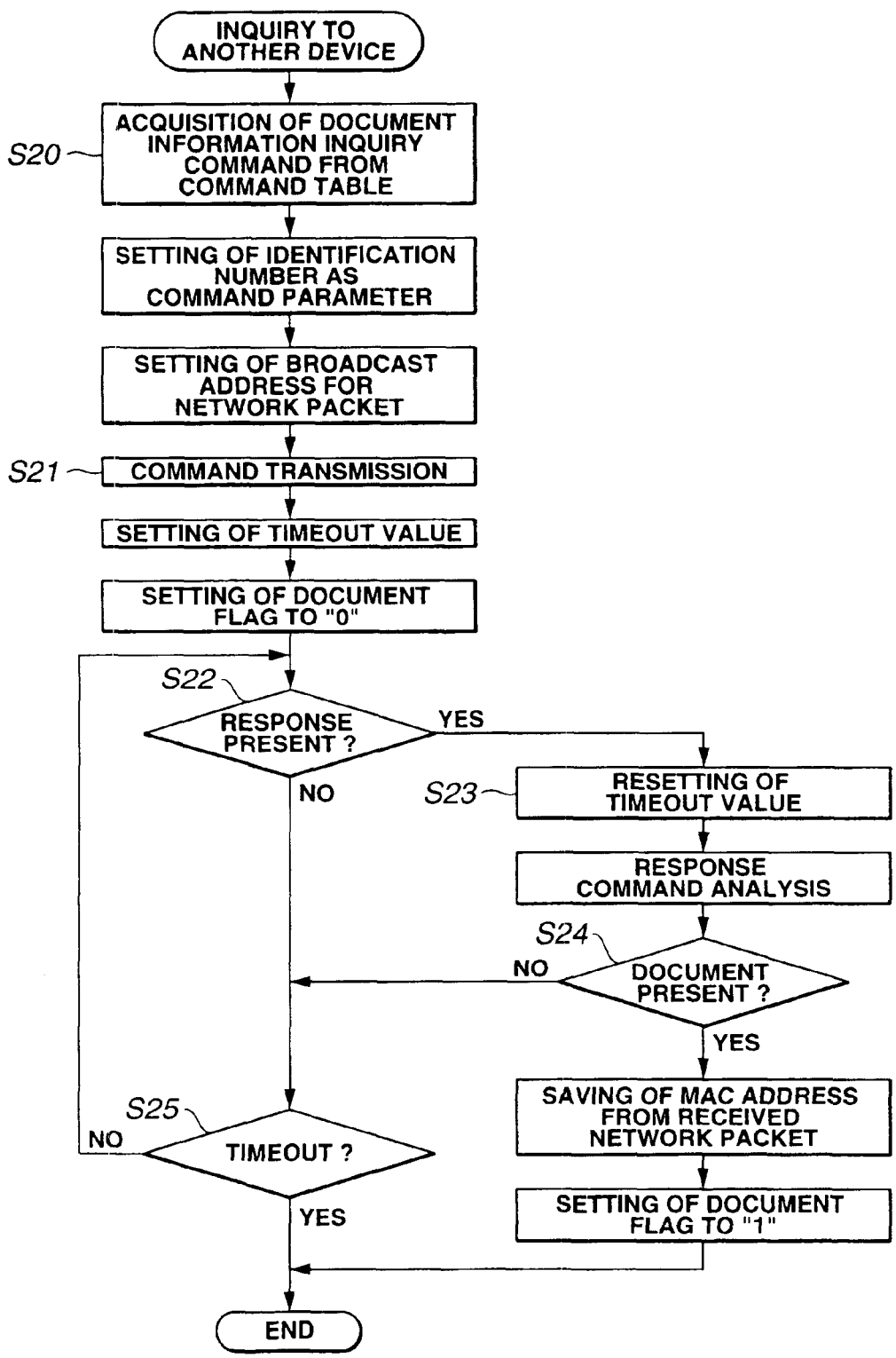
FIG. 10 is a flowchart for the inquiry processing of FIG. 9.
Figure 11:
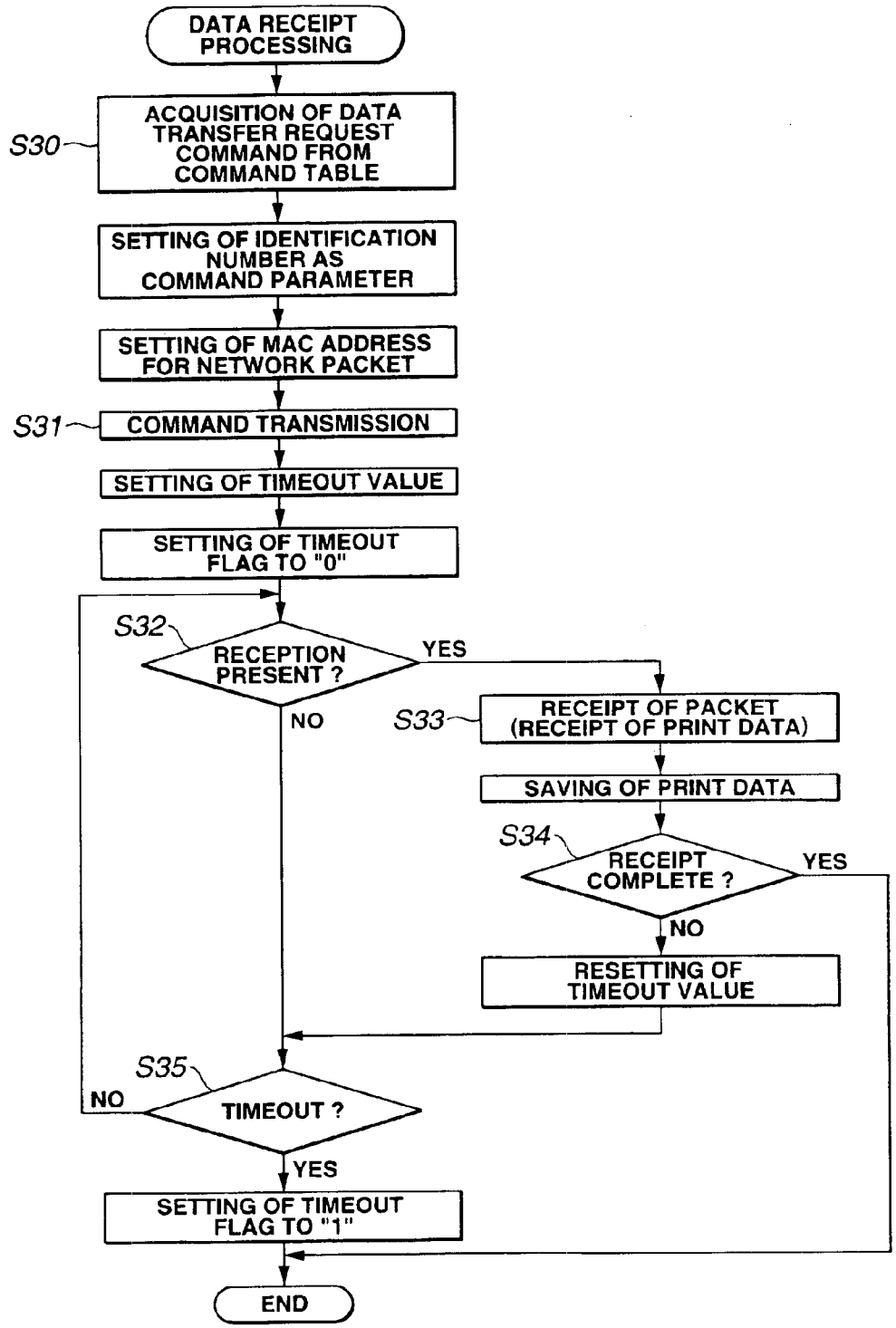
FIG. 11 is a flowchart for the reception processing of the request origin printer in FIG. 9.
Figure 12:
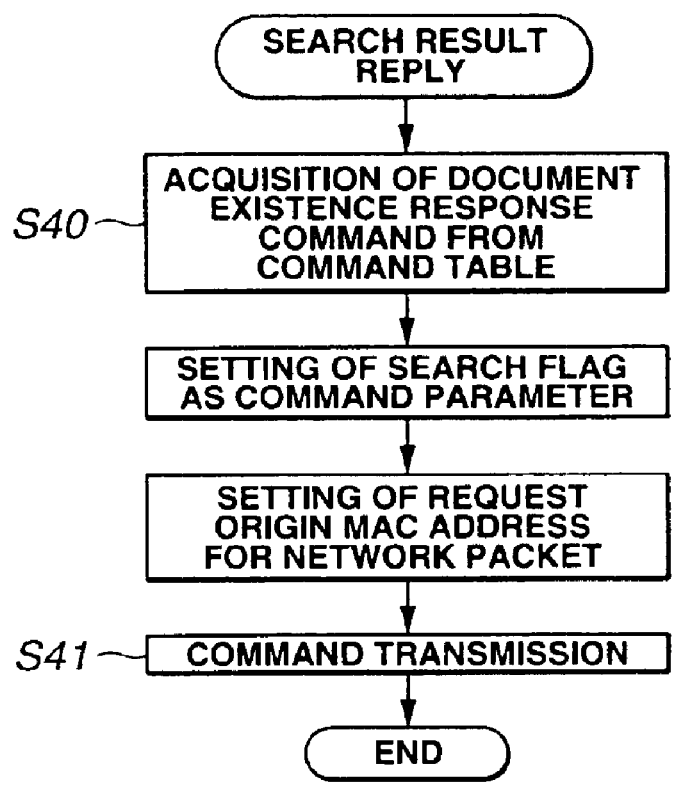
FIG. 12 is a flowchart for the search result reply processing of the request destination printer in FIG. 9.
Figure 13:
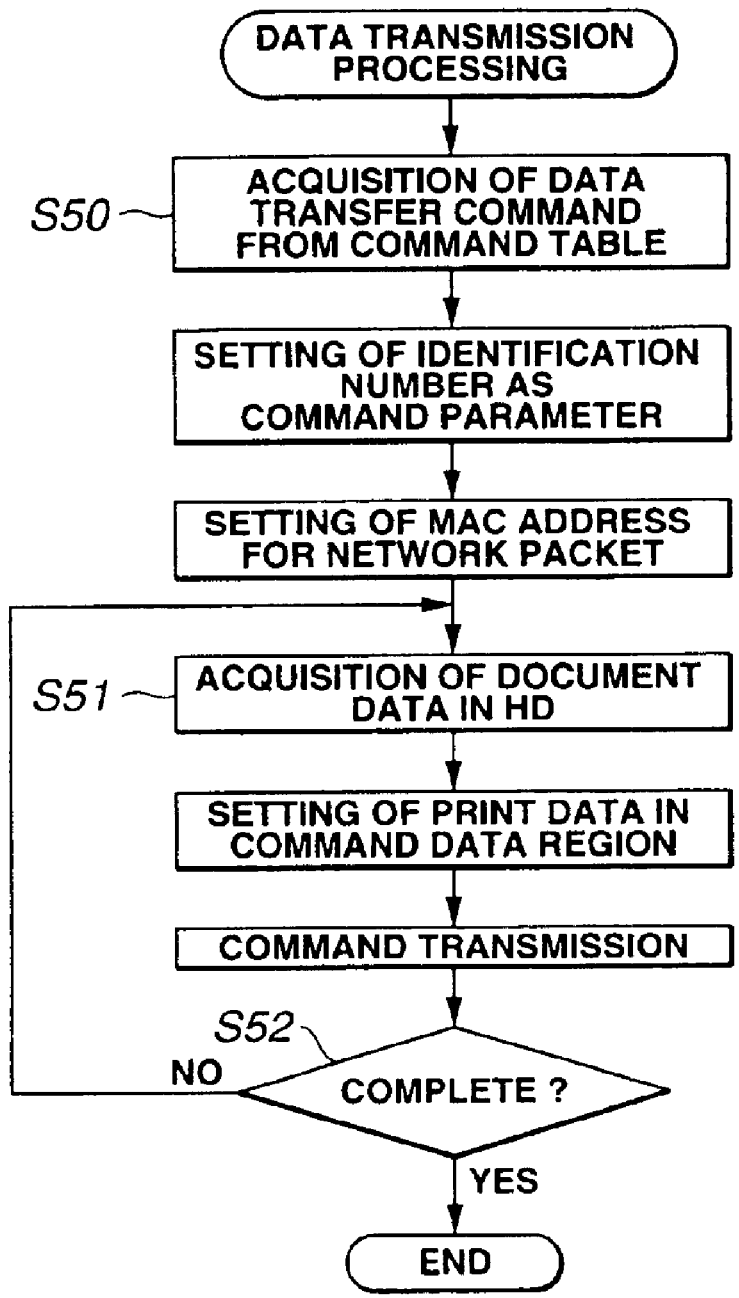
FIG. 13 is a flowchart for the data transmission processing of the request destination printer in FIG. 9.

Next, printer control processing will be described. FIG. 7 is a flowchart for the control of the printer in FIG. 2; FIG. 8 is an explanatory view of the search operation by the printer in FIG. 1; FIG. 9 is an explanatory view of the protocol used between the printers in FIG. 8; FIG. 10 is a flowchart for the inquiry processing of FIG. 9; FIG. 11 is a flowchart for the reception processing of the request origin printer in FIG. 9; FIG. 12 is a flowchart for the search result reply processing of the request destination printer in FIG. 9; and FIG. 13 is a flowchart for the data transmission processing of the request destination printer in FIG. 9.

Printer control processing will now be described by means of FIG. 7.

(S1) It is judged whether data has been received via the pair of host interfaces 40.

(S2) When received data is present, the command analyzing unit 41 judges whether or not the received data is print data.

(S3) If the received data is print data, it is judged whether the print data contains the identification number ON command. As described in FIG. 5, when the operator wishes to perform printing by acquiring the identification number, the operator sets identification number acquisition to ON via the printer properties of the personal computer 1 and issues an instruction to start printing. When the identification number has been checked as being ON, the printer driver 10 transmits the identification number ON command to the printer 2 and then transmits ordinary print data.

Furthermore, when the identification number is set to OFF, the printer driver 10 transmits only print data. In addition, when the identification number is input and printing is instructed, the printer driver 10 transmits a saved document print command and the identification number thus input.

When the printer 2 receives the identification number ON command, the command analyzing unit 41 notifies the numbering control unit 45 that this constitutes data to be identified. In addition, upon receiving the print data, the command analyzing unit 41 notifies the numbering control unit 45 that the print data has been received and transfers the print data to the drawing unit 42. As was described earlier, the numbering control unit 45 newly determines the identification number by acquiring the numbering value from the EEPROM 60 and adding the device serial number.

The drawing unit 42 requests the identification number from the numbering control unit 45, adds the identification number thus acquired to the ordinary print data (bitmap data), and transfers this data to the print control unit 43 for printing. At the same time, based on the instruction from the numbering control unit 45, the drawing unit 42 transmits the identification number and the print data to the HD control unit 46 and the H) control unit 46 then saves the identification number and print data in the HD6.

On the other hand, when an identification number ON command is not recognized, the command analyzing unit 41 transfers the print data to the drawing unit 42. The drawing unit 42 opens the data as bitmap data and transfers same to the print control unit 43 for printing. The processing then returns to step S1.

(S4) When it is judged in step S1 that received data is not present, it is judged whether there is an identification number input via the operator panel 5. In the absence of an identification number input, processing returns to step S1. When there is an identification number input, processing moves on to step S5.

(S5) An identification number is input via the operator panel 5 and the printer driver 10. After saving the identification number thus input, the numbering control unit 45 searches for a corresponding document in the HD6 via the H) control unit 46.

(S6) If there is a corresponding document in the HD6, the print data for this document is read and transferred to the print control unit 43 for printing. In this case, although printing of the identification number is generally unnecessary, the identification number may be printed. The processing then returns to step S1.

(S7) As shown in FIG. 9, the printer 2 has a predetermined document information inquiry command, a document existence response command in response thereto, a data transfer request command, and a data transfer command constituting a response.

In the search of step S5, if a corresponding document is not present in the HD6 within the device, an identification number is designated as a parameter for a document information inquiry command, and, in order to search for another network-connected device, the document information inquiry command is transmitted to the network 3 in the form of a broadcast via a data transmission unit 47 and the interface control unit 40. The inquiry processing will be explained subsequently in FIG. 10.

(S8) When a saved document is present, the printers 2, which have thus received via the broadcast, reply to the request origin device by designating a "1" when present within the parameters of the document existence response command and a "0" when not present within the parameters. The request origin printer 2 checks the parameter of the document existence response command, and, if "1", performs data receipt processing (described subsequently in FIG. 11).

In other words, a data transfer request command is transmitted to the device for which there has been a response regarding the presence of a document. Having received a data transfer request command, the printer transmits document data for printing to the request origin device. The transmission origin printer sets the timeout for receipt of the document data at 10 seconds, for example, and, when the document data has not been received during this time interval, the transmission origin printer ends the processing at timeout. Likewise, the transmission origin printer ends the processing if the parameter of the document existence response command is "0". In such a case, the absence of corresponding print data is displayed on the operator panel and the processing returns to step S1.

On the other hand, when document data is received normally, the processing moves on to step S6 and the document data is analyzed and printed. These sequences are shown in FIGS. 8 and 9. FIG. 8 shows an aspect in which document data with the identification number "001002" requested by the printer 2-B is obtained from the printer 2-A and printed by the printer 2-B.

(S9) When it is judged in step S2 that the received data is not print data, it is judged whether or not the received data is a saved document print command (see FIG. 5). In the event of a saved document print command, the processing moves on to step S5, whereupon a search for the document is conducted and the document is printed. That is, as shown in FIG. 5, an item for transmitting the identification number to the printer is newly provided in printer properties in PC1, for example, which is the host, and the identification number is then transmitted to the printer. The printer 2 analyzes the received identification number by means of the command analyzing unit, judges the existence of this identification number via the numbering control unit 45 and the HD control unit 46, and prints the designated document as detailed above. As a result, a document in the printer device can be printed simply by means of an identification number input by an external device such as the PC1, and document data can be acquired from and printed by a printer connected to the network.

(S10) When the received data is not a saved document print command, it is judged whether the received data is an inquiry command instructing a saved document search.

(S11) When the received data is an inquiry command instructing a saved document search, the search flag is first set to "0", and the numbering control unit 45 searches the HD6 for the corresponding document via the HD control unit 46, under the identification number of the inquiry command.

If the corresponding saved document is present, the search flag is set to "1". Then, as will be described subsequently by means of FIG. 12, when the saved document is present, the printer replies to the request origin device by designating a "1" when present within the parameters of the document existence response command and a "0" when not present within the parameters. The processing then returns to step S1.

(S12) When the received data is not an inquiry command instructing a saved document search, it is judged whether the received command is a data transfer request command. That is, the request source printer 2 checks the parameter of the document existence response command, and, if "1", transmits the data transfer request command to the device for which there has been a response regarding the presence of a document by means of data receipt processing (described subsequently by means of FIG. 11). Having received the data transfer request command, the printer 2 transmits the document data to be printed to the request source printer 2 as will be described subsequently by means of FIG. 13. The processing then returns to step S1. When the received command is not a data transfer request command, ordinary command processing other than printing is performed in accordance with the command, and the processing returns to step S1.

The operation will be described by means of FIGS. 1, 3, 5, 6, 8, and 9. First of all, in the document management by the printer, when the operator wishes to acquire and print the identification number on the document, the operator sets identification number management by placing a checkmark against ON, as shown in FIG. 5 via the printer properties of the personal computer 1. When the identification number has been set to ON, the printer driver 10 transmits an identification number ON command to the printer 2 and then transmits ordinary print data.

When the printer 2 receives the identification number ON command, the numbering control unit 45 newly determines the identification number by acquiring the numbering value from the EEPROM 60 and adding the device serial number, as described earlier. The drawing unit 42 requests the identification number from the numbering control unit 45, adds the acquired identification number to the ordinary print data (bitmap data), and transfers this data to the print control unit 43 for printing. At the same time, the drawing unit 42 transmits the identification number and the print data to the HD control unit 46 and the HD control unit 46 saves the identification number and print data in the HD6.

As shown in FIG. 3, the identification number "002001" is printed on the print document C, and the identification number and print data of the print document C are stored in the HD6. In this case, the identification number is automatically set so as to be unique to this document, whereby the duplicate assignment of the identification number can be prevented. Further, because the identification number is determined from a device specific value and serial number, the duplicate assignment of an identification number can be prevented even in a system in which a plurality of printers are connected, as shown in FIG. 1.

On the other hand, printing is also possible without using this document management function. That is, as shown in FIG. 5, when the operator wishes to perform printing without acquiring an identification number for the document, the operator sets identification number management by placing a checkmark against OFF via the printer properties of the personal computer 1. When the identification number has been set to OFF, the printer driver 10 transmits ordinary print data to the printer 2.

When the printer 2 does not recognize an identification number ON command, the command analyzing unit 41 transfers the print data to the drawing unit 42. The drawing unit 42 opens the print data as bitmap data, and transfers this data to the print control unit 43 for printing. Therefore, the determination and printing of the identification number as well as the storage thereof in the HD6 are not performed. This is therefore effective for the purpose of protecting documents and so forth so that same are not freely printed by other people, for example.

Next, in the reprinting of the documents managed by the printer, a reprint instruction is input via either the operator panel 5 or the printer driver 10. As shown in FIG. 6, the identification number input menu is selected by operating the switches 51 of the operator panel 5 and the desired identification number is input by means of the switches 51. Furthermore, as shown in FIG. 5, an item for transmitting the identification number to the printer is newly provided in the printer properties of the PC1, for example, which is the host, and the identification number and the saved document print command are transmitted to the printer.

In the printer 2, the numbering control unit 45 searches the HD6 via the HD control unit 46 for a corresponding document, under the identification number thus input. If the corresponding document is present in the HD6 of the printer 2, the numbering control unit 45 reads out the print data of this document and transfers this print data to the print control unit 43 for printing. In this case, although printing of the identification number is generally unnecessary, the identification number may be printed.

On the other hand, if, in the search of the HD6 performed by the printer 2 itself, there is no corresponding document in the HD6 within the device, a search of the saved documents of other printers 2 is conducted. That is, as shown in FIG. 9, an identification number is designated as the parameter of the document information inquiry command, and, in order to search for other network-connected printers, a document information inquiry command is transmitted to the network 3 in the form of a broadcast.

When a saved document is present, the printers 2, which have thus received via the broadcast, reply to the request origin device by designating a "1" when present within the parameters of the document existence response command and a "0" when not present within the parameters. The request origin printer 2 checks the parameter of the document existence response command, and, if "1", transmits the data transfer request command to the device for which there has been a response regarding the presence of a document. Having received the data transfer request command, the printer transmits the print data to be printed to the request source device.

Upon receiving document data normally, the request source printer 2 analyzes and prints the document data. FIG. 8 shows an aspect in which document data with the identification number "001002" requested by the printer 2-B is obtained from the printer 2-A and printed by the printer 2-B.

Because print documents are thus managed, searched, and printed by the printer, duplicates of printed material can be easily obtained by a general-purpose printer used by a multiplicity of hosts.

Next, the details of the processing in FIG. 7 will be described by means of FIGS. 10 and 13. First of all, the inquiry processing will be described by means of FIG. 10.

(S20) A document inquiry command is acquired from a command table in the printer 2 and an identification number is set as the command parameter. A broadcast address is then established for the network packet.

(S21) After the command has been transmitted, the timeout value is set, "0" is set as the document flag, and a response is awaited.

(S22) A judgment as to the existence of a response is made.

(S23) When there is a response, the timeout value is reset, and the response command is analyzed.

(S24) When it is judged via the response command analysis that a document is present, the MAC address from the received network packet (address of the device with the document) is saved, "1 " is set as the document flag, and then the processing ends.

(S25) On the other hand, when there is no response in step S22, or when it is judged in step S24 that there is no document, a timeout judgment is performed. If timeout has not been reached, the processing returns to step S22, while the processing ends in the event of timeout.

Next, the data receipt processing will be described by means of FIG. 11.

(S30) A data transfer request command is acquired from the command table in the printer 2 and an identification number is set as the command parameter. The abovementioned MAC address of the device that has responded regarding the presence of the document is then established for the network packet.

(S31) After the command has been transmitted, the timeout value is set, "0" is set as the timeout flag, and the printer 2 awaits the receipt of data.

(S32) It is judged whether data has been received.

(S33) When data is present, a packet (print data) is received and then saved.

(S34) It is judged whether the receipt of data has ended, and if so, the processing is ended. When data receipt has not ended, the timeout value is reset.

(S35) On the other hand, in the absence of received data in step S32 or when it is judged in step S34 that the receipt of data has not ended, a timeout judgment is performed. When timeout has not been reached, the processing returns to step S32, and, in the event of timeout, "1" is set as the timeout flag and the processing ends.

Next, the search result reply processing will be described by means of FIG. 12.

(S40) A document existence response command is acquired from the command table in the printer 2 and the search flag (see FIG. 7) constituting the search result is set. The abovementioned MAC address of the request origin device is then established for the network packet.

(S41) This command is transmitted and processing ends.

Next, data transmission processing will be described by means of FIG. 13.

(S50) A data transfer command is acquired from the command table in the printer 2 and an identification number is set as the command parameter. The MAC address of the request origin device is then established for the network packet.

(S51) The document data in the HD6 is acquired, print data is set in the data region of the command, and the command thus set is then transmitted.

(S52) It is judged whether all the print data has been transmitted, and, when all the print data has not been transmitted, the processing returns to step S51, and the remaining print data is transmitted. When transmission of all the print data is complete, the processing is ended.

Therefore, by equipping the printer 2 with a predetermined document information inquiry command, a document existence response command in response thereto, a data transfer request command, and a data transfer command constituting a response to the data transfer request command, and by affording the printer 2 these processing functions, documents that have not been saved in this printer can be obtained from other network-connected printers and can be printed by the printer itself. Hence, duplicate printed material can be obtained by the printer that receives a request for duplicates without the user searching for the printer with the saved document or going to this printer. This is particularly effective in a system in which a multiplicity of printers is network-connected.

[Second Embodiment]

Figure 14:
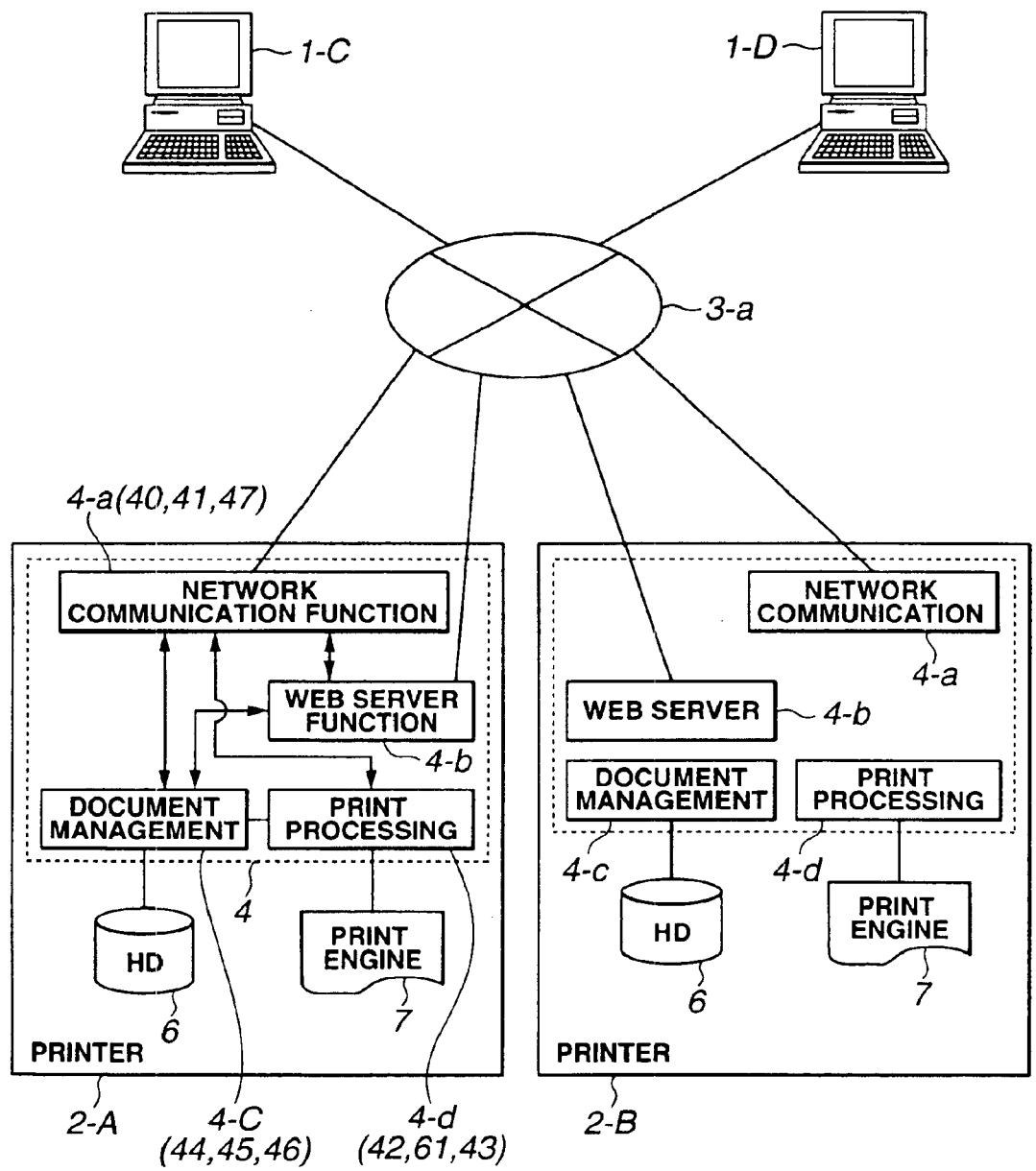
FIG. 14 is a constitutional view of the system of a second embodiment of the present invention.
Figure 15:
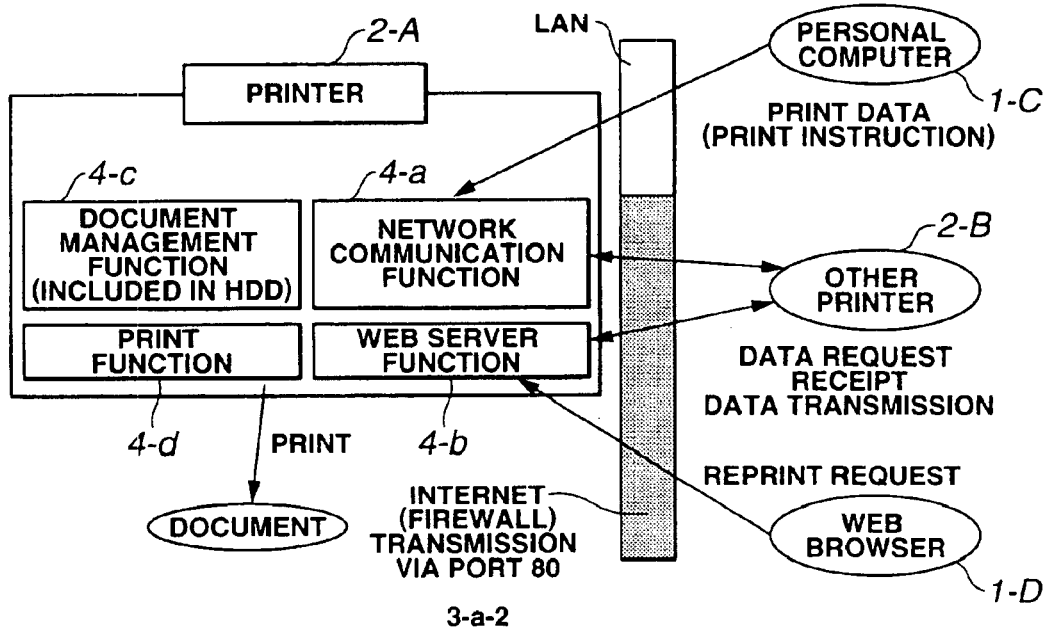
FIG. 15 is a constitutional view of the interface in FIG. 14.
Figure 16:
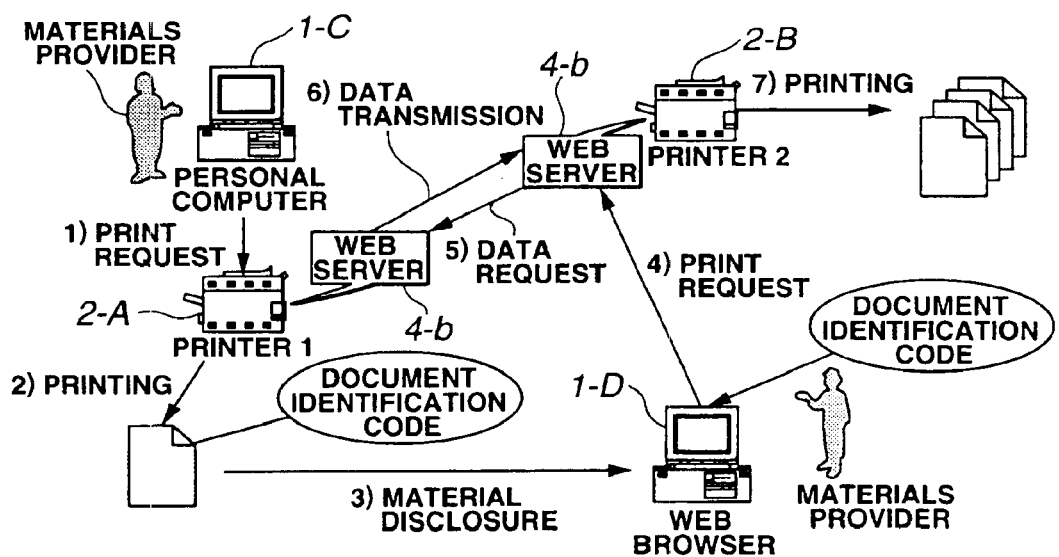
FIG. 16 is an explanatory view of the operation of the system in FIG. 14.

Next, an embodiment that uses a WAN (Wide Area Network) as the abovementioned network 3 will be described. FIG. 14 is a system constitutional view of the second embodiment of the present invention. FIG. 15 is a constitutional view of the interface in FIG. 14. FIG. 16 is an explanatory view of the operation of the system in FIG. 14. In these figures, those parts which are the same as those shown in FIGS. 1 and 2 are shown with the same reference symbols.

In FIG. 14, the printers 2-A and 2-B are connected to a personal computer 1-C and a Web client terminal 1-D via a WAN 3-$a$. The WAN 3-$a$ comprises the LAN described above.

The printers 2-A and 2-B comprise a network communication function (processing) unit 4-$a$ that provides network communications with the other devices 1-C, 1-D, and 2-B and so forth via the WAN 3-$a$; a document management function (processing) unit 4-C that performs the abovementioned document management; a Web server function (processing) unit 4-$b$ that functions as the Web server of the WAN 3-$a$; a printing unit 4-$d$; a hard disk 6; and a printer engine 7.

The network communication processing unit 4-$a$ is equivalent to the interface control unit 40, the command analyzing unit 41, and the data transmission processing unit 47 of FIG. 2. The document management unit 4-$c$ is equivalent to the operator panel control unit 44, the numbering control unit 45, and the HD control unit 46. The printing unit 4-$d$ is equivalent to the drawing unit 42, the bitmap memory 61, and the printing unit 43.

The Web server processing unit 4-$b$ has been added to the constitution of the printer in FIG. 2 and is constituted by the Web server that has the home page of a WAN such as the Internet.

The operation to access this system will now be described by means of FIG. 15. The WAN 3 is constituted by a LAN 3-$a$-1 and the Internet 3-a-2. The personal computer 1-C connected to the LAN 3-$a$-1 conducts network communications via the LAN 3-$a$-1 with the network communication function 4-$a$ of the printer 2-A.

Further, the other printer 2-B connected to the Internet 3-$a$-2, and the terminal 1-D, which has the Web browser, perform Web communications via the Internet 3-*a*-2 (via a port 80 of a firewall) with the Web server function 4-*b* of the printer 2-A. The network function 4-*a* performs network communications with the terminal 1-D and the other printer 2-B via the Internet 3-*a*-2.

Figure 17:
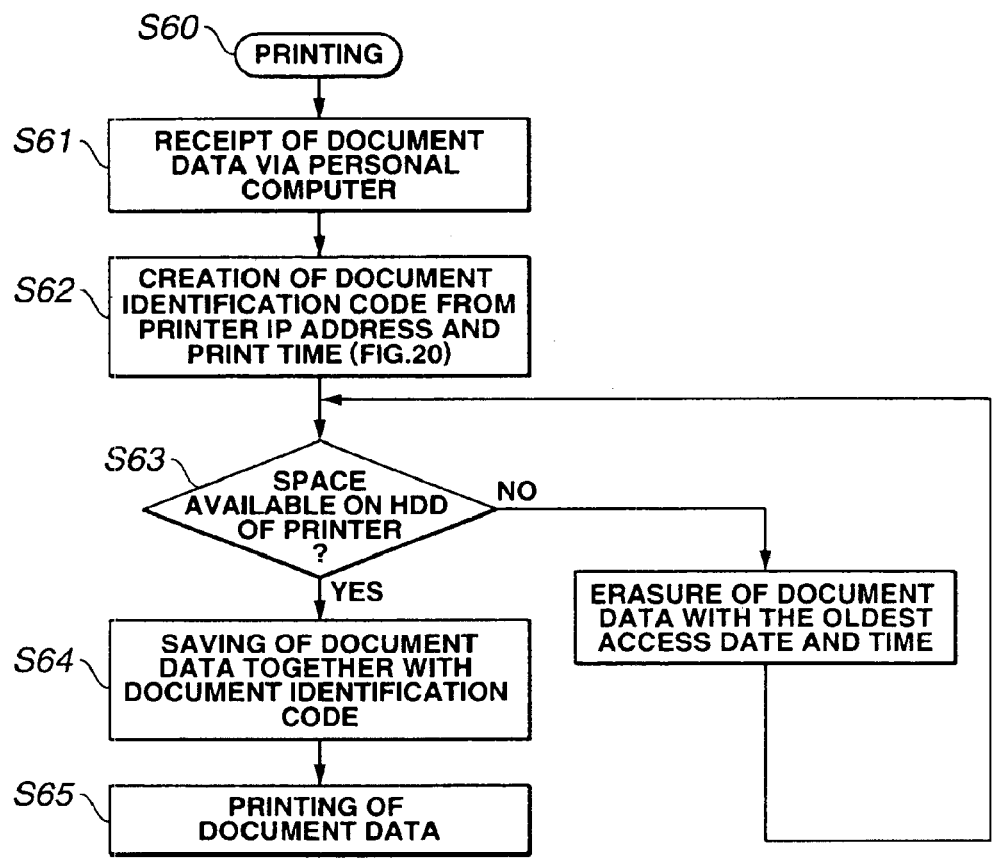
FIG. 17 is a print processing flowchart for the document management function in FIG. 14.

Next, document print processing will be described first by means of FIGS. 16 and 17.

(S60) A request for document printing is issued by the personal computer 1-C to the printer 2-A via the LAN 3-*a*.

(S61) The network communication processing unit 4-*a* receives document data from the personal computer 1-C.

Figure 20:
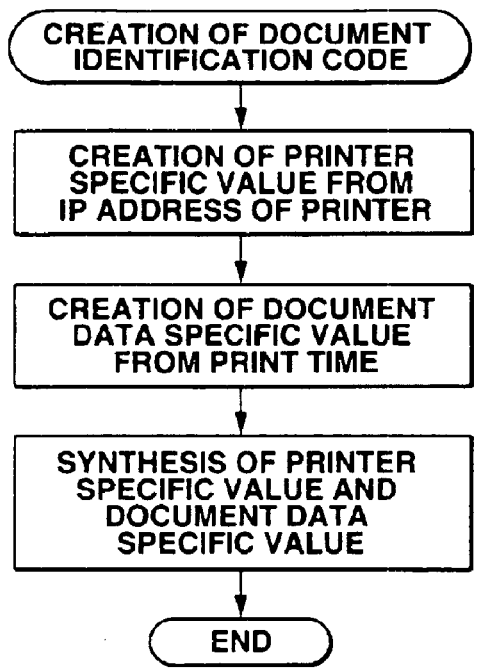
FIG. 20 is a flowchart of the document identification code creation processing in FIG. 17.
Figure 22:
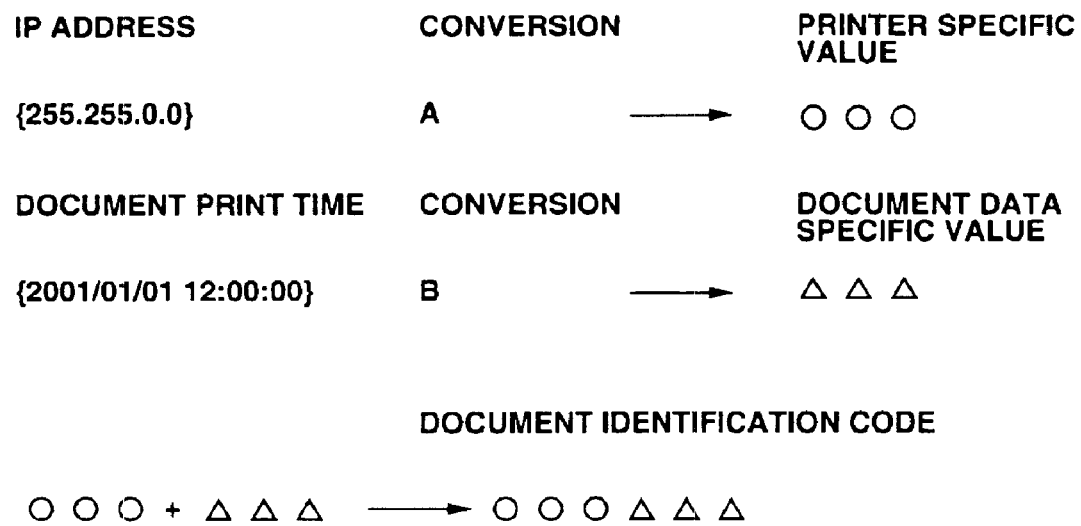
FIG. 22 is an explanatory view of the document identification code creation processing in FIG. 20.

(S62) The document management function unit 4-*c* allocates a document identification code (document identification number) to the document data. The processing to create the document identification code is described by means of FIGS. 20 and 22. A printer-specific value is created in accordance with a predetermined conversion format from the network address (IP address) of the printer 2-A. Next, a document data specific value is created in accordance with a predetermined conversion format from the document print time (start time of the print processing) of this document. The printer-specific value and the document data specific value are synthesized (the document data specific value is added to the printer-specific value, for example) to create the document identification code. In other words, this code is created uniquely from the printer address and the document print date and time and allows a search to be performed reversibly.

(S63) The document management function unit 4-*c* judges whether there is a space in the HDD 6 for storing the document data. When no space exists, the access date and time of the document data in the HDD 6 is checked. The HDD 6 stores the document access date and time, and, when the document is accessed, the document access date and time is updated. In this embodiment, this is the date and time at which printing or reprinting was last requested. Then, the document data with the oldest access date and time is erased. As a result, storage space for a new document is ensured and it is possible to prevent frequently accessed documents from being erased.

(S64) The document management function unit 4-*c* stores the document data in the storage device (HDD) 6 together with the document identification code.

(S65) The document management unit 4-*c* sends the document data and the document identification code to the printing unit 4-*d*. As per FIG. 2, the data undergoes drawing processing and is opened as a bitmap image, and the print engine 7 prints a document in part of which the document identification code appears. This constitutes the printing process of this system.

Figure 18:
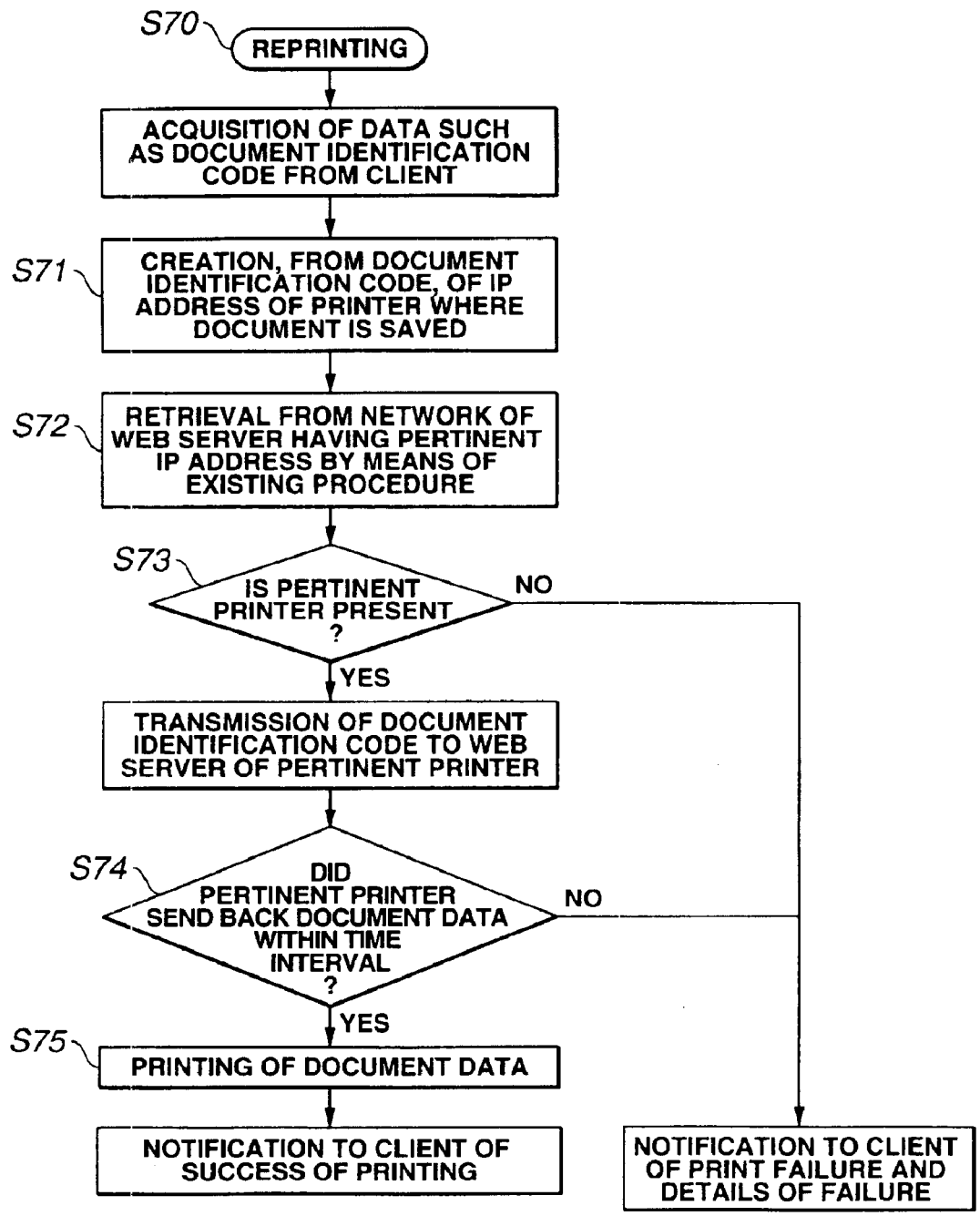
FIG. 18 is a reprint processing flowchart for the document management function in FIG. 14.

Next, processing in which the party making the document materials request or the document owner reacquires the document on the basis of the document identification code will be described by means of FIGS. 18 and 19.

(S70) The party requesting the document owns a corresponding printer in the system (the printer 2-B, for example). The party requesting the document accesses the Web server function 4-*b* of his or her printer 2-B via the Web client 1-D. The Web server function 4-*b* of the printer 2-B requests and acquires the document identification code and number of prints and the like of the reacquired document from the Web client 1-D.

(S71) The Web server function 4-*d* of the printer 2-B sends the document identification code thus input to the network communication function 4-*a*. The network communication function 4-*a* extracts the network address of the printer 2-A from the document identification code thus acquired. That is, as per FIGS. 21 and 23, the network communication function 4-*a* extracts the printer specific value from the document identification code and converts the printer specific value into a network address IP address by means of an inverse operation.

(S72) The network communication unit 4-*a* searches the Web server at this IP address by means of a commonly known network search method.

(S73) Upon judging from the search result that this printer is not present, the network communication unit 4-*a* notifies the client terminal 1-D of the print failure and the details of the failure. Conversely, when this printer exists, the network communication unit 4-*a* accesses the Web server function 4-*b* of this printer 2-A and transmits the document identification code.

Figure 19:
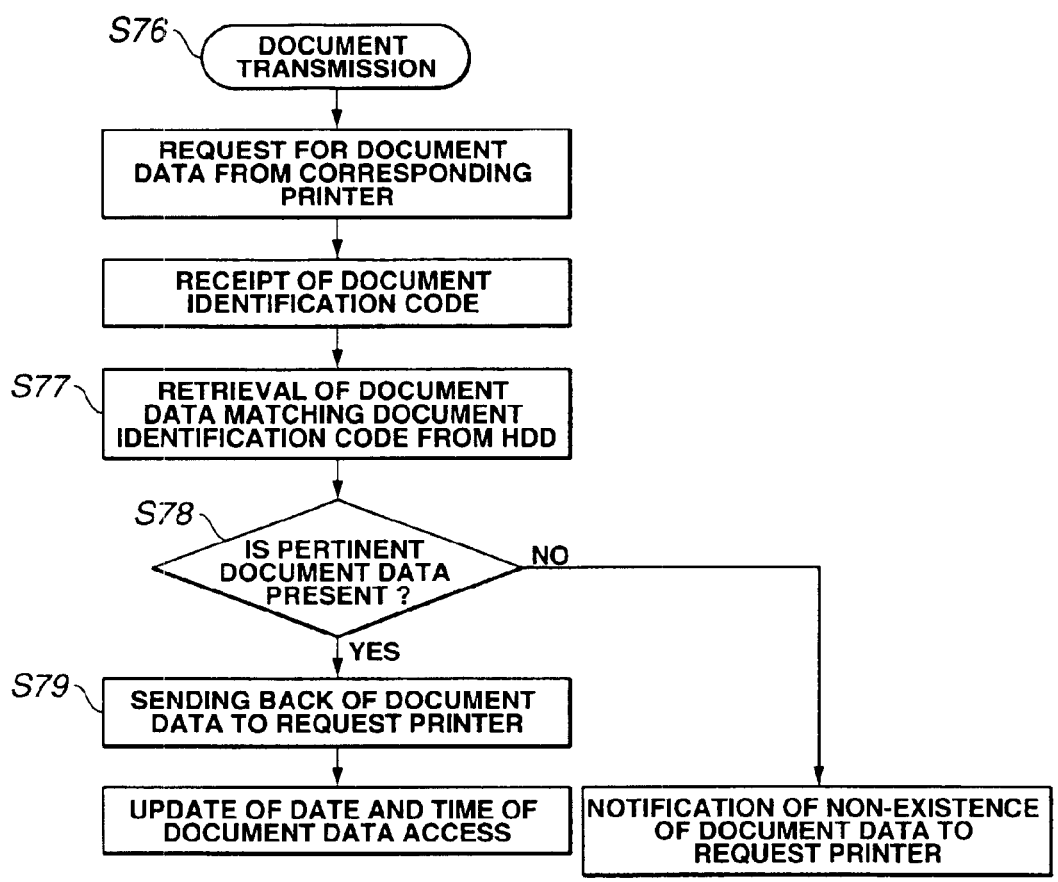
FIG. 19 is a document transmission processing flowchart for the document management function in FIG. 14.

(S74) As described in the document transmission processing of FIG. 19, the Web server function 4-*b* of the printer 2-A thus accessed transmits the document identification code to the document management function 4-*c* and the document management function 4-*c* retrieves the document data from the HDD 6 and transmits this document data to the network communication function 4-*a* of the access-origin printer 2-B via the Web server function 4-*b*. The network communication function 4-*a* of the printer 2-B monitors the time interval from the start of access, and, when the document data is not received within a predetermined time interval, the network communication function 4-*a* notifies the client terminal 1-D of the print failure and the details of the failure.

(S75) When the document data is received within the time interval, the network communication unit 4-*a* of the printer 2-B sends the document data to the printing unit 4-*d*. The printing unit 4-*d* generates print image data on the basis of the document data and prints the requested number of copies of the document by controlling the print engine 7. The network communication unit 4-*a* then notifies the client terminal 1-D that printing has been successful.

The abovementioned document transmission processing will now be described by means of FIG. 19.

(S76) The Web server function 4-*b* of the printer 2-A receives a document data request from the access origin, and receives the document identification code.

(S77) The Web server function 4-*b* transmits the document identification code to the document management function 4-*c* and the document management function 4-*c* retrieves the document corresponding with the document identification code from the HDD 6.

(S78) Upon judging from the search result that document data is not present, the document management function 4-*c* transmits the fact that the document data is not present to the network communication function 4-*a* of the access-origin printer 2-B via the Web server function 4-*b*.

(S79) Upon judging from the search result that the document data is present, the document management function 4-*c* receives the document data from the HDD 6 and transmits this document data to the network communication unit 4-*a* of the access-origin printer 2-B via the network communication unit 4-*a*. The access date and time of the document data in the HDD 6 is then updated.

This constitutes the document reacquisition process of this system. In the description provided above, the access origin was the printer 2-B and the access destination was the printer 2-A. However, the operation is also similar when the access origin is the printer 2-A and the access destination is the printer 2-B. Further, the description was of an example in which the print document data of the personal computer 1-C was reprinted by the client terminal 1-D. However, a similar implementation is also possible when the print document data of the client terminal 1-D is saved in the printer 2-B and the personal computer 1-C is operated such that reprinting is performed by the printer 2-A.

[Third Embodiment]

Figure 24:
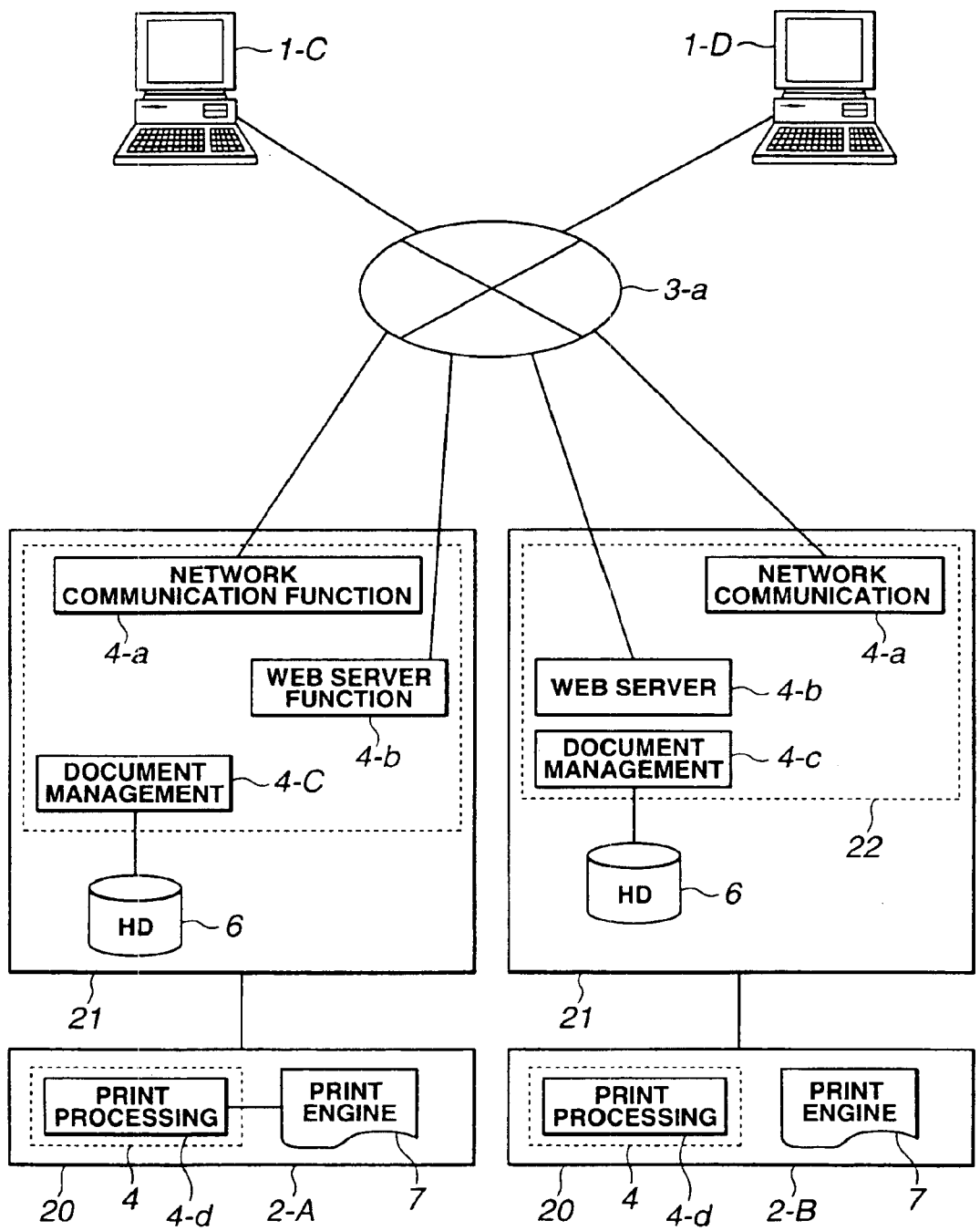
FIG. 24 is a system constitutional view of the third embodiment of the present invention.
Figure 25:
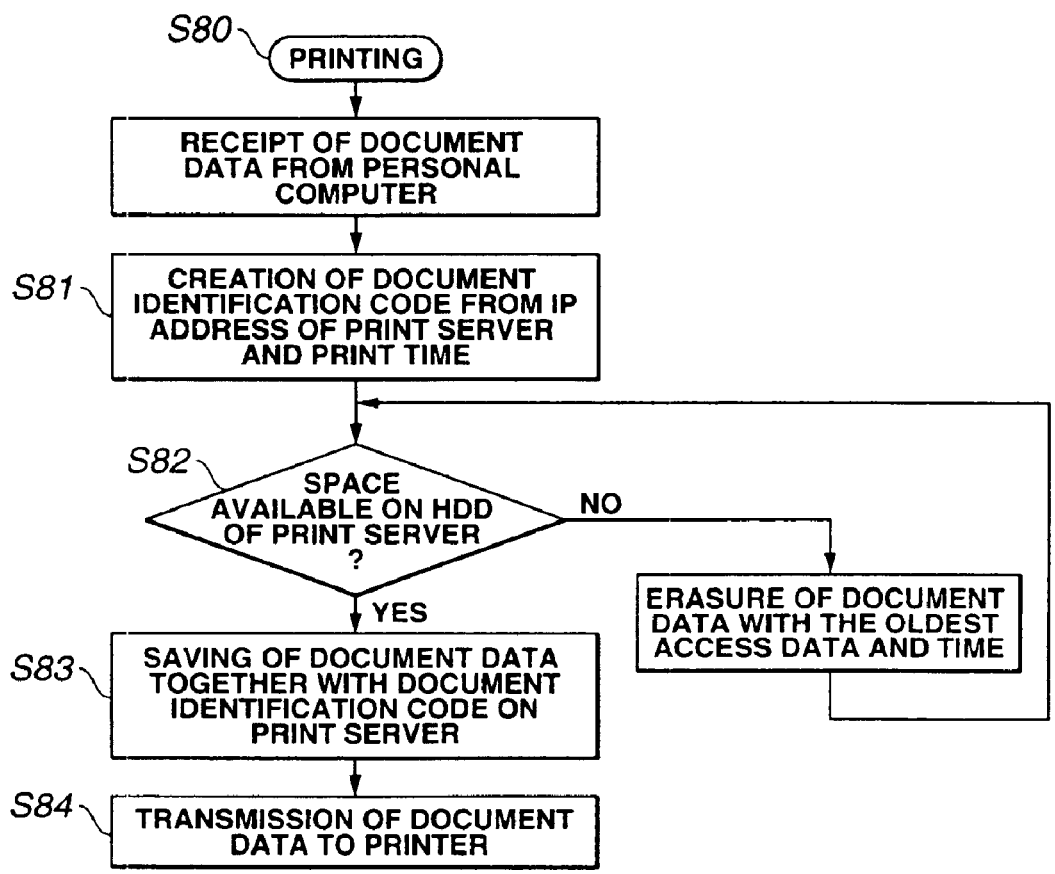
FIG. 25 is a print processing flowchart for the document management function in FIG. 24.
Figure 26:
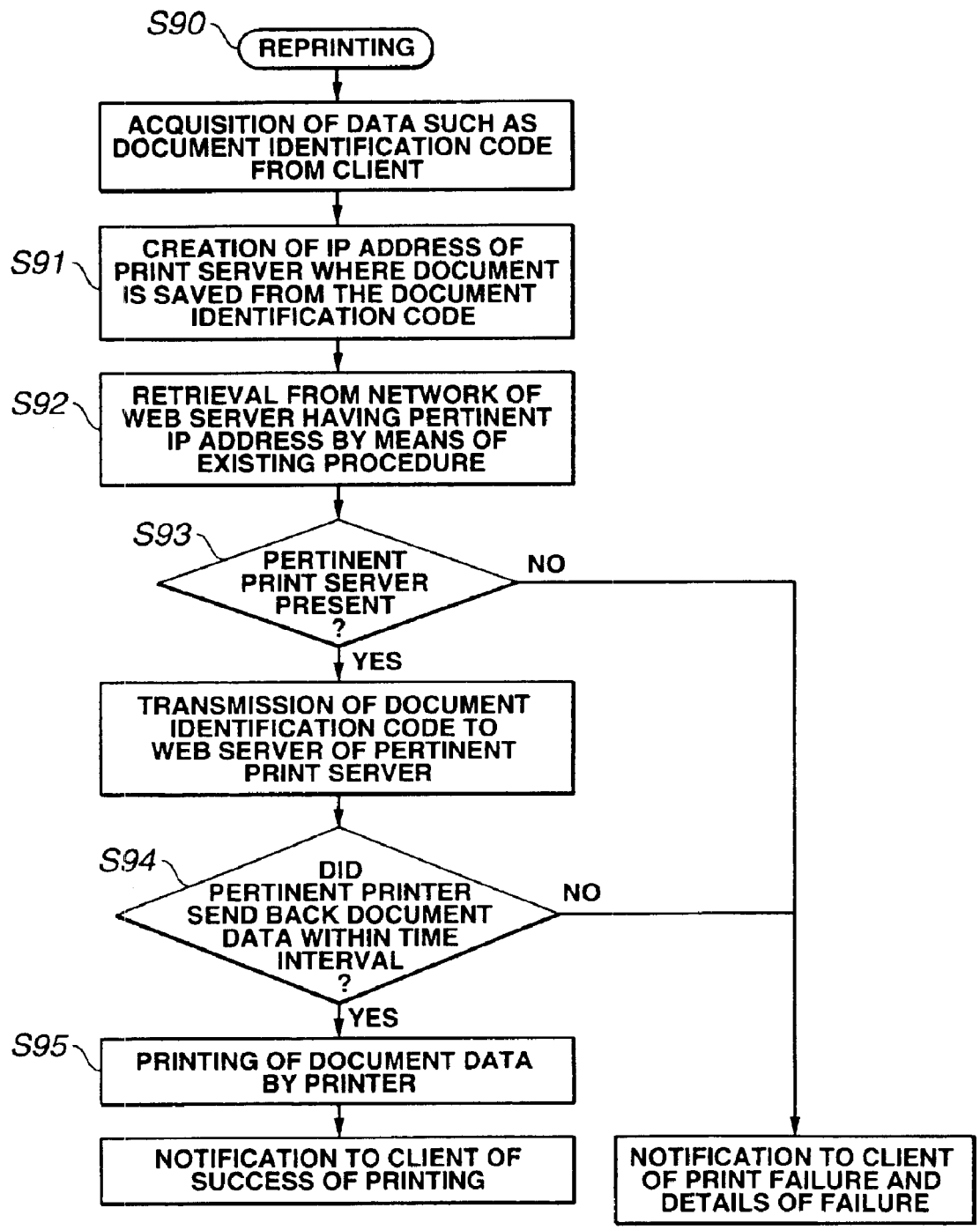
FIG. 26 is a reprint processing flowchart for the document management function in FIG. 24.
Figure 27:
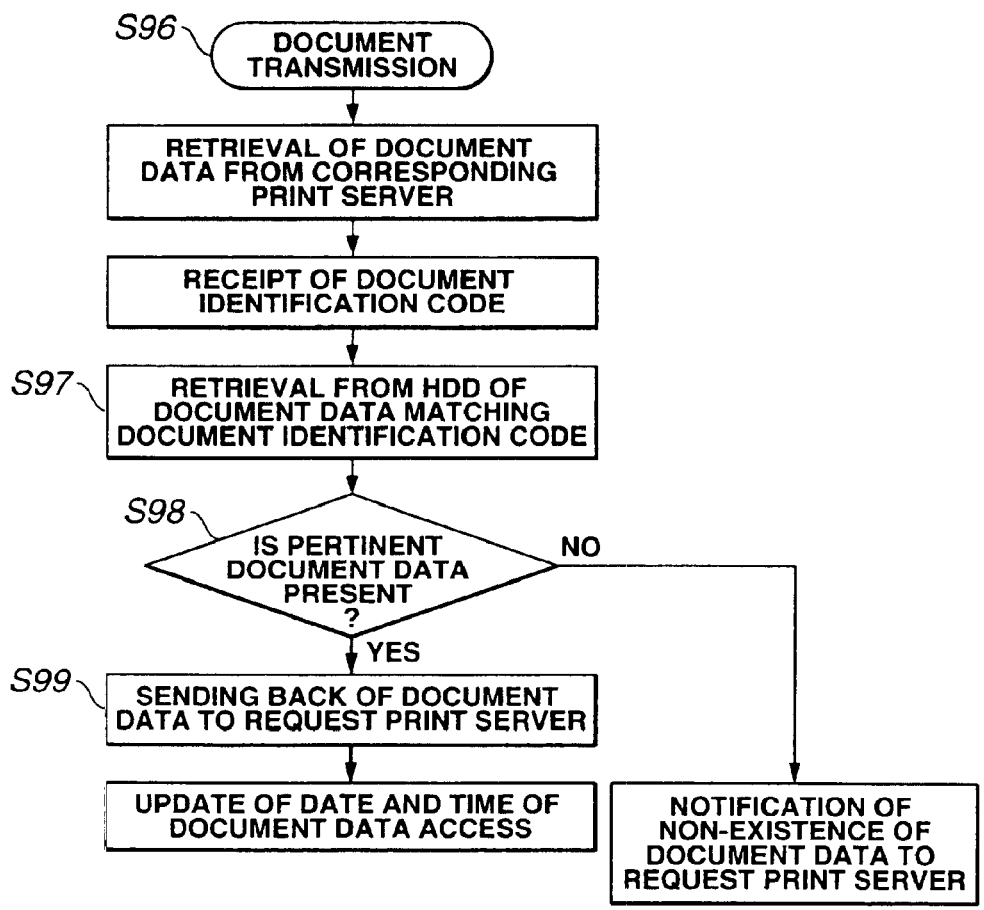
FIG. 27 is a document transmission processing flowchart for the document management function in FIG. 24.
Figure 28:
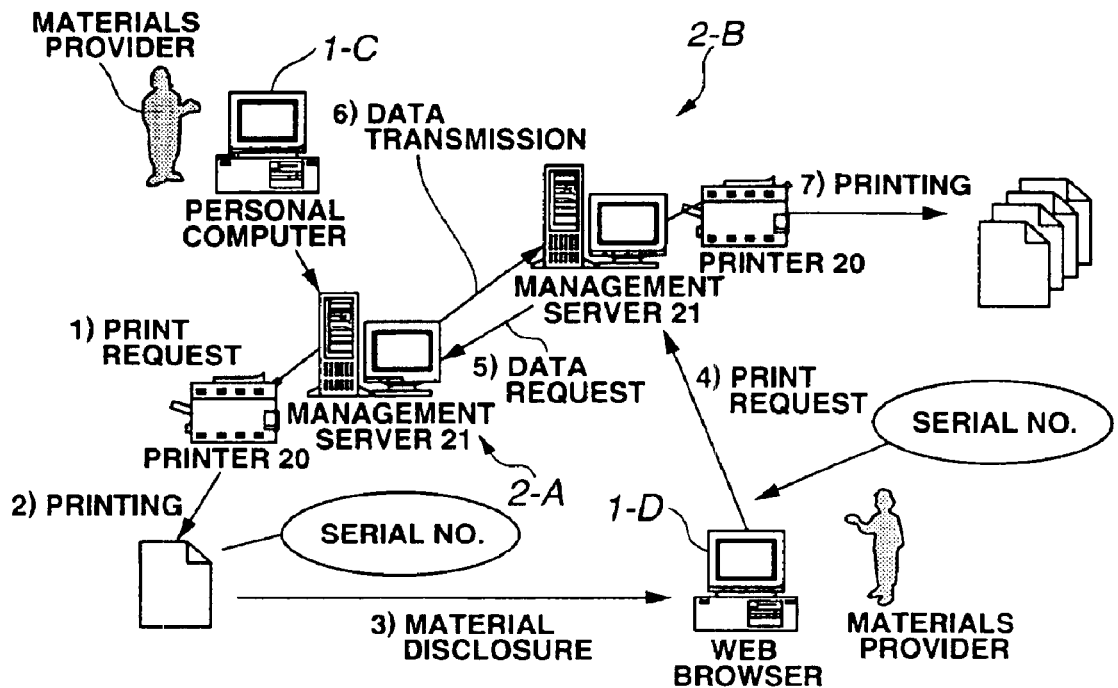
FIG. 28 is an explanatory view of the operation of the system in FIG. 24.

Next, an embodiment for a case where the printer does not comprise the HDD 6, which constitutes a modified example of the second embodiment, will be described. FIG. 24 is a constitutional view of the system of the third embodiment of the present invention. FIG. 25 is a flowchart for the print processing of FIG. 24; FIG. 26 is a flowchart for the reprint processing of FIG. 24; and FIG. 27 is a flowchart for the document transmission processing of FIG. 24. FIG. 28 is an explanatory view of the operation of the system in FIG. 24. In these figures, those parts which are the same as those shown in FIGS. 1, 2, and 14 are shown with the same reference symbols.

In FIG. 24, the printers 2-A and 2-B are connected to and managed by a management server 21. Each management server 21 is connected to a personal computer 1-C and a Web client terminal 1-D via the WAN 3-a. This WAN 3-a contains the abovementioned LAN.

The management server 21 acts as a print server and comprises a data processing unit 22 having a network communication function (processing) unit 4-a that provides network communications with the other devices 1-C, 1-D, and 2-B and so forth via the WAN 3-a, a document management function (processing) unit 4-C that performs the abovementioned document management, and a Web server function (processing) unit 4-b that functions as the Web server of the WAN 3-a; and a hard disk (HDD) 6.

A printer 20 connected to the management server 21 comprises a controller 4, which has the printing unit 4-d; and a printer engine 7. The Web server processing unit 4-b is constituted by a Web server that has the home page of a WAN such as the Internet.

The network communication processing unit 4-a of the management server 21 is equivalent to the interface control unit 40, the command analyzing unit 41, and the data transmission unit 47 in FIG. 2. The document management unit 4-c is equivalent to the numbering control unit 45 and the HD control unit 46.

The controller 4 of the printers 2-A and 2-B is equivalent to the interface control unit 40, the command analyzing unit 41, the data transmission unit 47, the drawing unit 42, the bitmap memory 61, and the printing unit 43 in FIG. 2.

As for the operation to access this system, as per FIG. 15 described above, the WAN 3 is constituted by the LAN 3-a-1 and the internet 3-a-2. The personal computer 1-C connected to the LAN 3-a-1 performs network communications via the LAN 3-a-1 with the network communication function 4-a of the management server 21 of the printer 2-A.

Further, the management server 21 of the other printer 2-B connected to the Internet 3-a-2, and the terminal 1-D, which has the Web browser, perform Web communications via the Web server function 4-b of the management server 21 of the printer 2-A and the Internet 3-a-2 (via the port 80 of a firewall). The network function 4-a performs network communications with the terminal 1-D and the management server 21 of the other printer 2-B via the Internet 3-a-2.

Next, the document print processing will first be described by means of FIGS. 25 and 28.

(S80) A request for document printing is made by the personal computer 1-C to the management server 21 of the printer 2-A via the LAN 3-a. The network communication processing unit 4-a then receives the document data from the personal computer 1-C.

(S81) The document management function unit 4-c allocates a document identification code (document identification number) to the document data. As per the description of the processing to create the document identification code by means of FIGS. 20 and 22, a print server-specific value is created in accordance with a predetermined conversion format from the network address (IP address) of the management server 21. Next, a document data specific value is created in accordance with a predetermined conversion format from the document print time (start time of the print processing) of this document. The print server-specific value and the document data specific value are synthesized to create the document identification code. In other words, this code is created uniquely from the print server address and the document print date and time and allows a search to be performed reversibly.

(S82) The document management function unit 4-c judges whether there is a space in the HDD 6 for storing the document data. When no space exists, the access date and time of the document data in the HDD 6 is checked. Then, the document data with the oldest access date and time is erased. As a result, storage space for a new document is ensured and it is possible to prevent frequently accessed documents from being erased.

(S83) The document management function unit 4-c stores the document data in the storage device (HDD) 6 of the print server 21 together with the document identification code.

(S84) The document management unit 4-c sends the document data and the document identification code to the printing unit 4-d of the printer 20. As in FIG. 2, the data undergoes drawing processing and is opened as a bitmap image, and the printer engine 7 prints a document in part of which the document identification code appears. This constitutes the printing process of this system.

Next, processing in which the party making the document materials request or the document owner reacquires the document on the basis of the document identification code will be described by means of FIGS. 26, 27 and 28.

(S90) The party requesting the document owns the corresponding print server 21 and printer in the system (the printer 2-B, for example). The party requesting the document accesses the Web server function 4-b of the print server 21 of his or her printer 2-B via the Web client 1-D. The Web server function 4-b of the print server 21 of the printer 2-B requests and acquires the document identification code and number of prints and the like of the reacquired document from the Web client 1-D.

Figure 21:
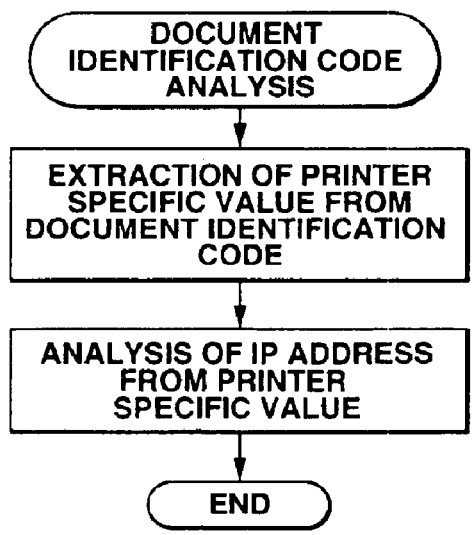
FIG. 21 is a flowchart of the IP address analysis processing in FIG. 18.
Figure 23:
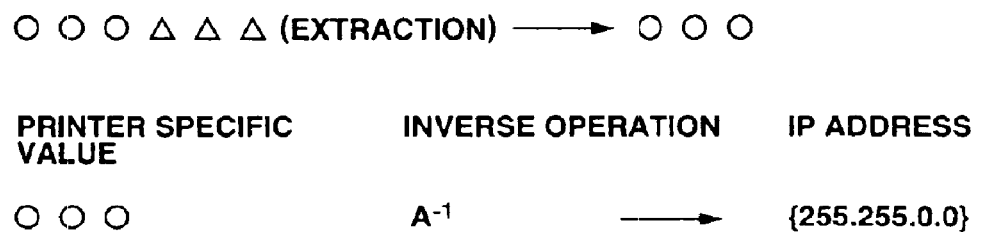
FIG. 23 is an explanatory view of the IP address analysis processing in FIG. 20.

(S91) The Web server function 4-d of the print server 21 of the printer 2-B sends the document identification code thus input to the network communication function 4-a. The network communication function 4-a extracts the network address of the printer 2-A from the document identification code thus acquired. That is, as shown in FIGS. 21 and 23, the network communication function 4-a extracts the print server specific value from the document identification code and converts the print server specific value into a network address IP address by means of an inverse operation.

(S92) The network communication unit 4-a searches the Web server at this IP address by means of a commonly known network search method.

(S93) Upon judging from the search result that this print server is not present, the network communication unit 4-a notifies the client terminal 1-D of the print failure and the details of the failure. Conversely, when this print server exists, the network communication unit 4-*a* accesses the Web server function 4-*b* of this print server and transmits the document identification code.

(S94) As described in the document transmission processing of FIG. 27, the Web server function 4-*b* of the print server 21 of the printer 2-A thus accessed transmits the document identification code to the document management function 4-*c* and the document management function 4-*c* retrieves the document data from the HDD 6 and transmits this document data to the network communication function 4-*a* of the access-origin print server 21 via the Web server function 4-*b*. The network communication function 4-*a* of the print server 21 monitors the time interval from the start of access, and, when the document data is not received within a predetermined time interval, the network communication function 4-*a* notifies the client terminal 1-D of the print failure and the details of the failure.

(S95) When the document data is received within the time interval, the network communication unit 4-*a* of the print server 21 sends the document data to the printing unit 4-*d* of the printer 2-B. The printing unit 4-*d* generates print image data on the basis of the document data and prints the requested number of copies of the document by controlling the printer engine 7. The network communication unit 4-*a* then notifies the client terminal 1-D that printing has been successful.

The abovementioned document transmission processing will now be described by means of FIG. 27.

(S96) The Web server function 4-*b* of the print server 21 receives a document data request from the access origin, and receives the document identification code.

(S97) The Web server function 4-*b* transmits the document identification code to the document management function 4-*c* and the document management function 4-*c* retrieves the document corresponding with the document identification code from the HDD 6.

(S98) Upon judging from the search result that document data is not present, the document management function 4-*c* transmits the fact that the document data is not present to the network communication function 4-*a* of the access-origin printer print server 21 via the Web server function 4-*b*.

(S99) Upon judging from the search result that the document data is present, the document management function 4-*c* receives the document data from the HDD 6 and transmits this document data to the network communication unit 4-*a* of the access-origin print server 21 via the network communication unit 4-*a*. The access date and time of the document data in the HDD 6 is then updated.

This constitutes the document reacquisition process of this system. In the description provided above, the access origin was the print server 21 of the printer 2-B and the access destination was the print server 21 of the printer 2-A. However, the operation is also similar when the access origin is the print server 21 of the printer 2-A and the access destination is the print server 21 of the printer 2-B. Further, the description was of an example in which the print document data of the personal computer 1-C was reprinted by the client terminal 1-D. However, a similar implementation is also possible when the print document data of the client terminal 1-D is saved in the print server 21 of the printer 2-B and the personal computer 1-C is operated such that reprinting is performed by the printer 2-A.

Therefore, implementation is also possible in the case of a printer without a large capacity storage device by utilizing the function of the print server 21 that manages the printers.

[Fourth Embodiment]

Figure 29:
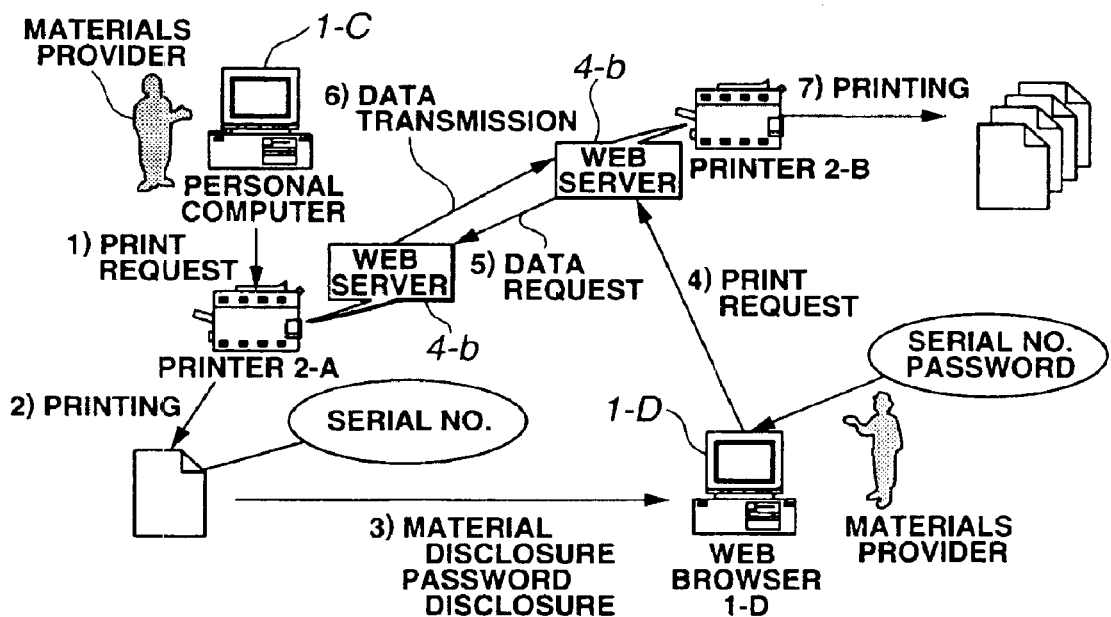
FIG. 29 is an explanatory view of the fourth embodiment of the present invention.
Figure 30:
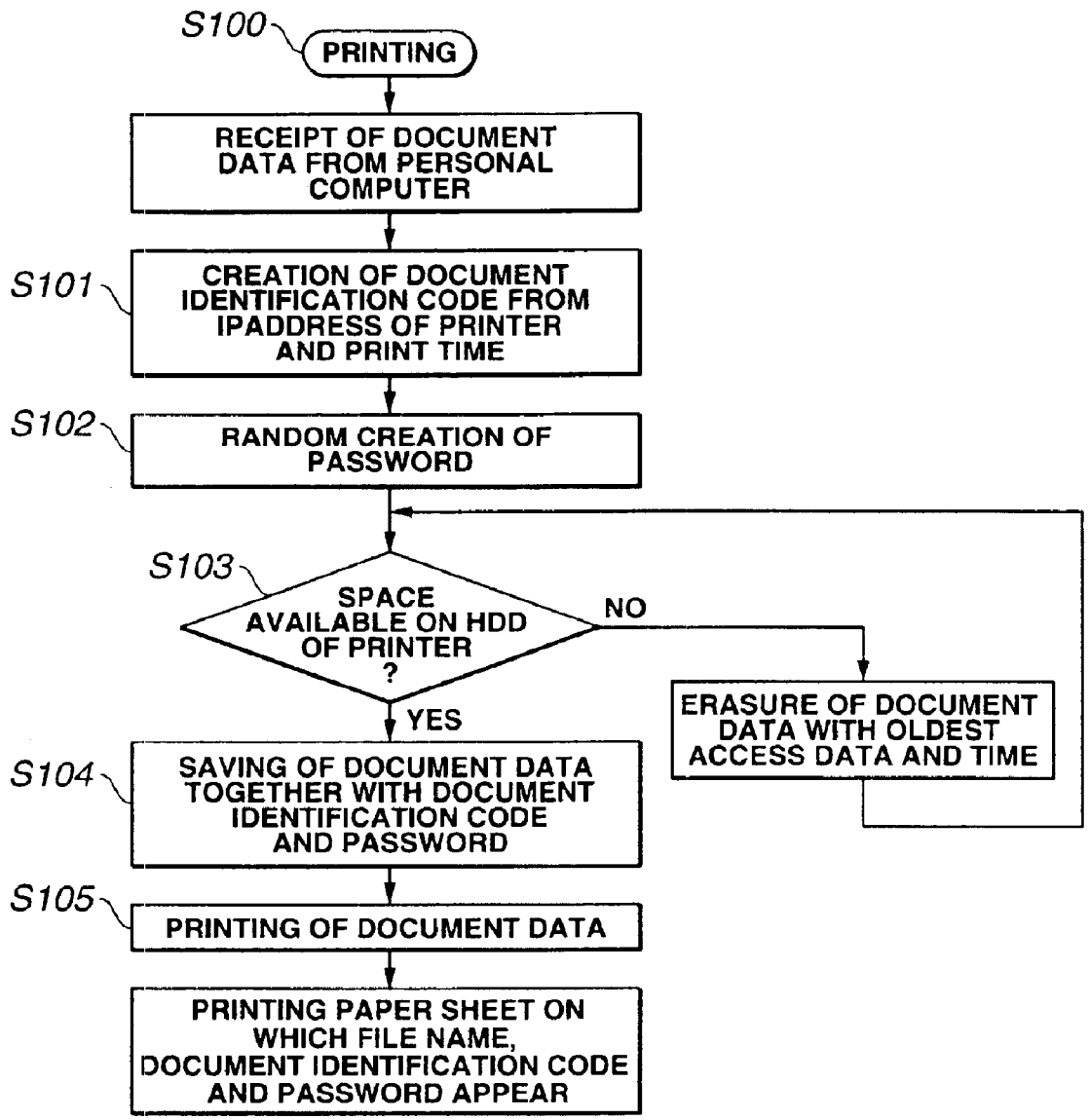
FIG. 30 is a print processing flowchart for the document management function in FIG. 29.
Figure 31:
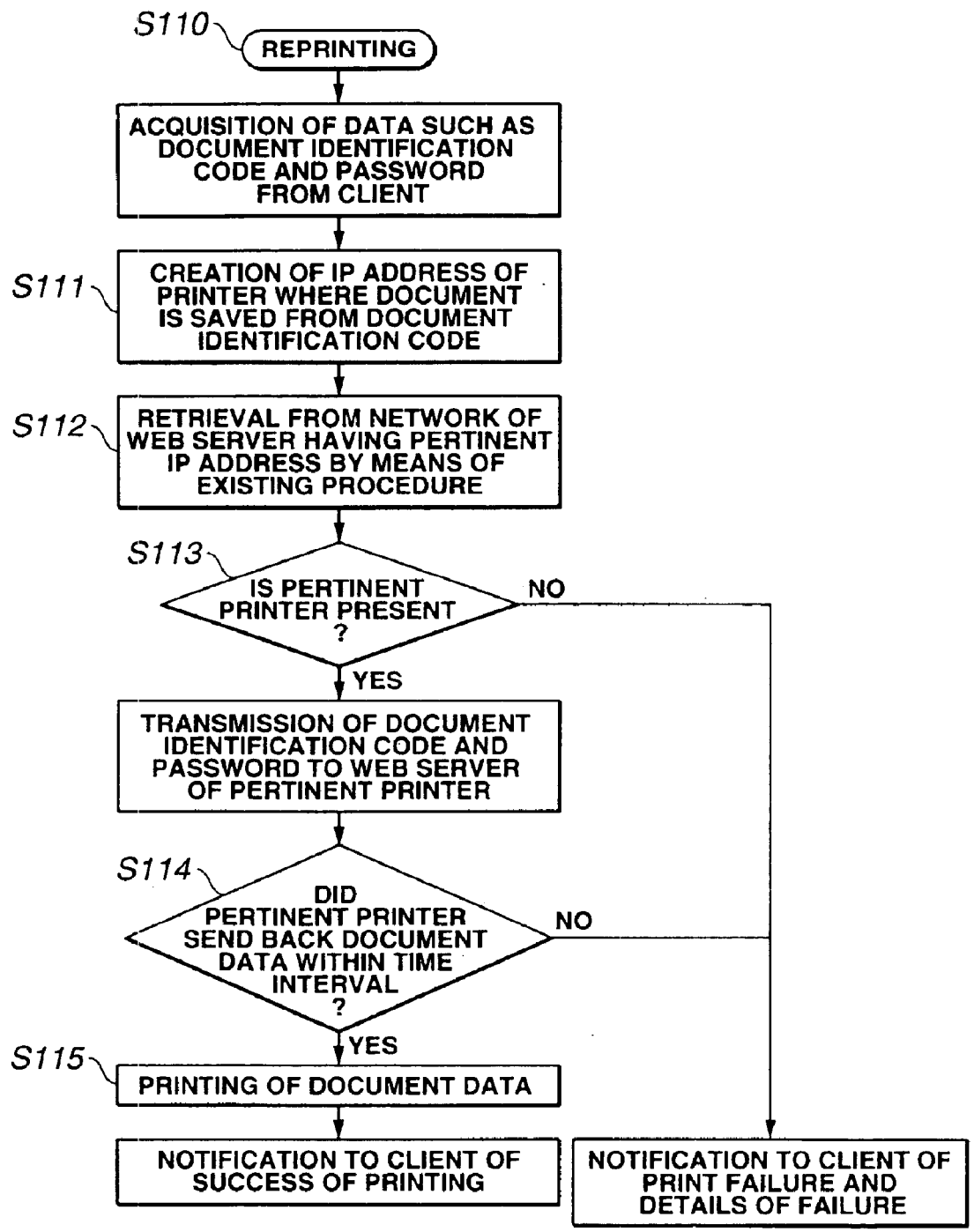
FIG. 31 is a reprint processing flowchart for the document management function in FIG. 29.
Figure 32:
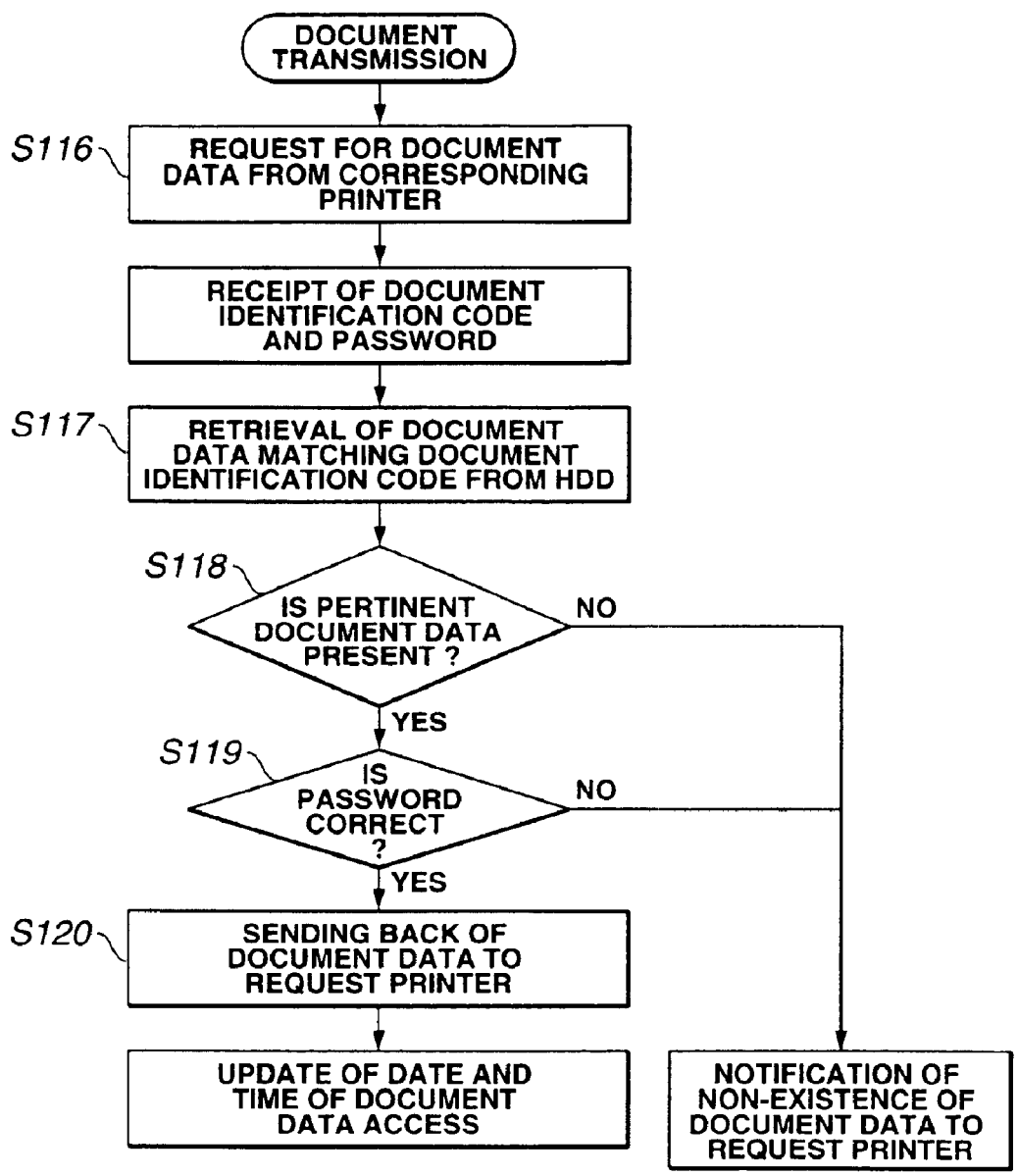
FIG. 32 is a document transmission processing flowchart for the document management function in FIG. 29.
Figure 35:
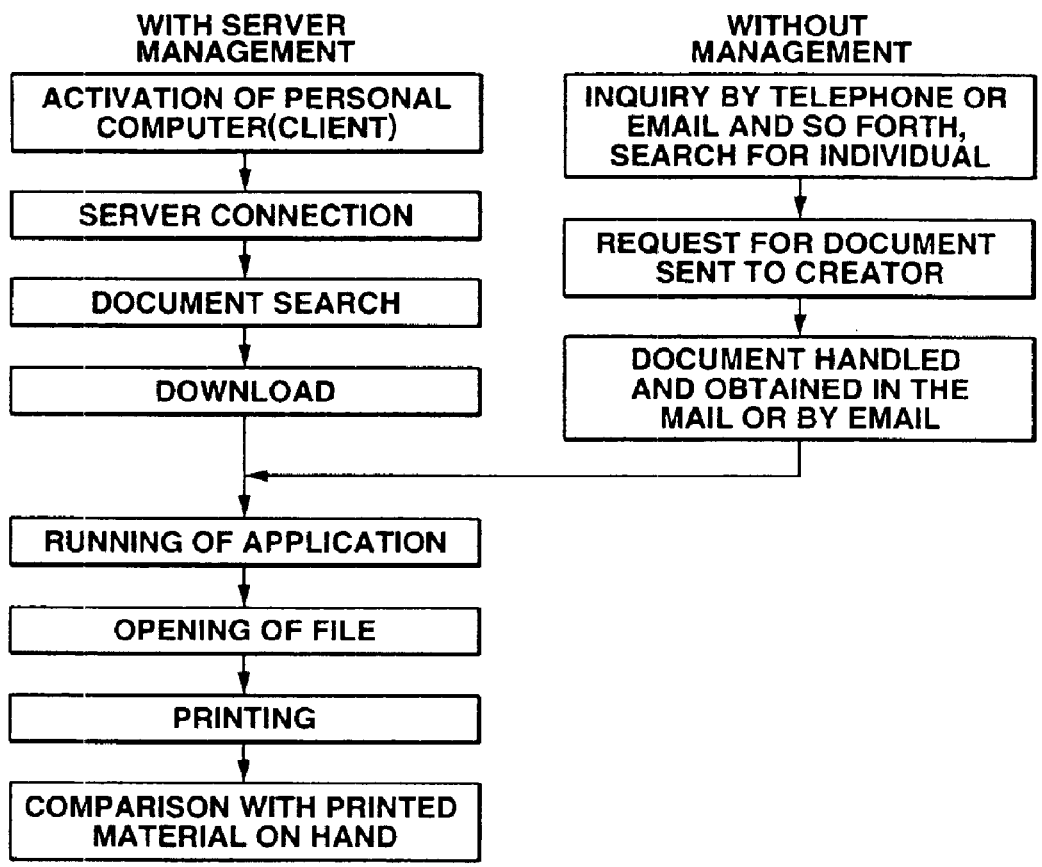
FIG. 35 is an explanatory view of the conventional technology.

Next, an embodiment that provides a security for the abovementioned print document will be described. FIG. 29 is an explanatory view of the fourth embodiment of the present invention, and FIG. 30 is a flowchart for the document print processing of the system in FIG. 29. FIG. 31 is a flowchart for the reprint document processing of the system in FIG. 29, and FIG. 32 is a flowchart for the document transmission processing of the system in FIG. 29. In the figures, those parts which are the same as those shown in FIGS. 1, 2, and 14 are shown with the same reference symbols.

In FIG. 29, similarly to FIG. 14, the printers 2-A and 2-B are connected to a personal computer 1-C and a Web client terminal 1-D via the WAN 3-*a*. The WAN 3-*a* comprises the LAN described above.

Similarly to FIG. 14, the printers 2-A and 2-B comprise a network communication function (processing) unit 4-*a* that provides network communications with the other devices 1-C, 1-D, and 2-B and so forth via the WAN 3-*a*; a document management function (processing) unit 4-C that performs the abovementioned document management; a Web server function (processing) unit 4-*b* that functions as the Web server of the WAN 3-*a*; a printing unit 4-*d*; a hard disk 6; and a printer engine 7.

The network communication processing unit 4-*a*, the document management unit 4-*c*, the printing unit 4-*d*, and the Web server processing unit 4-*b* are constituted in the same manner as in FIG. 14. In addition, the WAN 3 is constituted by the LAN 3-*a*-1 and the Internet 3-*a*-2. The personal computer 1-C connected to the LAN 3-*a*-1 performs network communications via the LAN 3-*a*-1 with the network communication function 4-*a* of the printer 2-A.

Further, the other printer 2-B connected to the Internet 3-*a*-2, and the terminal 1-D, which has the Web browser, perform Web communications via the Internet 3-*a*-2 (via a port 80 of a firewall) with the Web server function 4-*b* of the printer 2-A. The network function 4-*a* performs network communications with the terminal 1-D and the other printer 2-B via the Internet 3-*a*-2.

Next, document print processing will be described first by means of FIG. 30.

(S100) A request for document printing is issued by the personal computer 1-C to the printer 2-A via the LAN 3-*a*. The network communication processing unit 4-*a* receives document data from the personal computer 1-C.

(S101) The document management function unit 4-*c* allocates a document identification code (document identification number) to the document data. As described by means of FIGS. 20 and 22, the processing to create the document identification code is such that a printer-specific value is created in accordance with a predetermined conversion format from the network address (IP address) of the printer 2-A. Next, a document data specific value is created in accordance with a predetermined conversion format from the document print time (start time of the print processing) of this document. The printer-specific value and the document data specific value are synthesized (the document data specific value is added to the printer-specific value, for example) to create the document identification code. In other words, this code is created uniquely from the printer address and the document print date and time and allows a search to be performed reversibly.

(S102) Similarly, the document management function unit 4-*c* randomly generates a password for the document data.

(S103) The document management function unit 4-*c* judges whether there is a space in the HDD 6 for storing the document data. When no space exists, the access date and time of the document data in the HDD 6 is checked. Then, the document data with the oldest access date and time is erased. As a result, storage space for a new document is ensured and it is possible to prevent frequently accessed documents from being erased.

(S104) The document management function unit 4-*c* stores the document data in the storage device (HDD) 6 together with the document identification code and the password.

(S105) The document management unit 4-*c* sends the document data and the document identification code to the printing unit 4-*d*. As in FIG. 2, the data undergoes drawing processing and is opened as a bitmap image, and the print engine 7 prints a document in part of which the document identification code appears. In addition, the document management unit 4-*c* sends the document file name, the document identification code, and the password to the print processing unit 4-*d*. As per FIG. 2, the data undergoes drawing processing and is opened as a bitmap image, and the print engine 7 separately prints a document in which the document file name, document identification code, and password appear.

Next, processing in which the party making the document materials request or the document owner reacquires the document on the basis of the document identification code will be described by means of FIGS. 31 and 32.

(S110) The party requesting the document owns a corresponding printer in the system (the printer 2-B, for example). The party requesting the document accesses the Web server function 4-*b* of his or her printer 2-B via the Web client 1-D. The Web server function 4-*b* of the printer 2-B requests and acquires the document identification code, password, and number of prints and the like of the reacquired document from the Web client 1-D. FIG. 33 is an explanatory view of the reprinting (acquired document printing) request screen of the client terminal 1-D, where the serial number is the input field of the document identification code.

(S111) The Web server function 4-*d* of the printer 2-B sends the document identification code thus input to the network communication function 4-*a*. The network communication function 4-*a* extracts the network address of the printer 2-A from the document identification code thus acquired. That is, as shown in FIGS. 21 and 23, the network communication function 4-*a* extracts the printer specific value from the document identification code and converts the printer specific value into a network address IP address by means of an inverse operation.

(S112) The network communication unit 4-*a* searches the Web server at this IP address by means of a commonly known network search method.

(S113) Upon judging from the search result that this printer is not present, the network communication unit 4-*a* notifies the client terminal 1-D of the print failure and the details of the failure. Conversely, when this printer exists, the network communication unit 4-*a* accesses the Web server function 4-*b* of this printer 2-A and transmits the document identification code and the password.

(S114) As described in the document transmission processing of FIG. 32, the Web server function 4-*b* of the printer 2-A thus accessed transmits the document identification code to the document management function 4-*c* and, after retrieving the document data from the HDD 6 and checking the password, the document management function 4-*c* transmits this document data to the network communication function 4-*a* of the access-origin printer 2-B via the Web server function 4-*b*. The network communication function 4-*a* of the printer 2-B monitors the time interval from the start of access, and, when the document data is not received within a predetermined time interval, the network communication function 4-*a* notifies the client terminal 1-D of the print failure and the details of the failure.

(S115) When the document data is received within the time interval, the network communication unit 4-*a* of the printer 2-B sends the document data to the printing unit 4-*d*. The printing unit 4-*d* generates print image data on the basis of the document data and prints the requested number of copies of the document by controlling the print engine 7. The network communication unit 4-*a* then notifies the client terminal 1-D that printing has been successful.

The abovementioned document transmission processing will now be described by means of FIG. 32.

(S116) The Web server function 4-*b* of the printer 2-A receives a document data request from the access origin, and receives the document identification code and password.

(S117) The Web server function 4-*b* transmits the document identification code to the document management function 4-*c* and the document management function 4-*c* retrieves the document corresponding with the document identification code from the HDD 6.

(S118) Upon judging from the search result that document data is not present, the document management function 4-*c* transmits the fact that the document data is not present to the network communication function 4-*a* of the access-origin printer 2-B via the Web server function 4-*b*.

(S119) Upon judging from the search result that the document data is present, the document management function 4-*c* checks the document password and the transmitted password, and judges whether the transmitted password is correct. When the password is judged to be incorrect, the document management function 4-*c* transmits the fact that the document data is not present to the network communication function 4-*a* of the access-origin printer 2-B via the Web server function 4-*b*.

(S120) Conversely, when it is judged that the password is correct, the document management function 4-*c* receives the document data from the HDD 6 and transmits the document data to the network communication function 4-*a* of the access-origin printer 2-B via the network communication unit 4-*a*. Then the access date and time of the document data in the HDD 6 is updated.

This constitutes the document reacquisition process of this system. In the description provided above, the access origin was the printer 2-B and the access destination was the printer 2-A. However, the operation is also similar when the access origin is the printer 2-A and the access destination is the printer 2-B. Further, the description was of an example in which the print document data of the personal computer 1-C was reprinted by the client terminal 1-D. However, a similar implementation is also possible when the print document data of the client terminal 1-D is saved in the printer 2-B and the personal computer 1-C is operated such that reprinting is performed by the printer 2-A.

Document acquisition can therefore be managed by means of a password and it is possible to prevent document reprinting when this password is unknown. In addition, when a document identification code is allocated to the document data, the document management function of the printer allocates a password at the same time, the document data is stored together with the document identification code and password, and the password is printed on a separate sheet when the print function document printing is complete.

The Web server function of the printer also requests a password during document reacquisition. The password is sent to the network communication function of the printer and to the document management function together with the document identification code. Here, when the password and the document data retrieved by the document management function do not match, the processing is interrupted. It is thus possible to maintain document security even in an open environment.

[Other Embodiments]

In the case of the abovementioned system, in order to carry out document version management, a corresponding application that carries a function for adding a document identification code when the document is at the file stage is used by the personal computer. The personal computer assigns the document identification code when the document is at the creation stage. The printer uses this assigned identification code as the document identification code without creating an identification code. When requesting a reprint, the personal computer searches for the document with the same document identification code on the printer, and finds and prints the latest version of the document from either the date the file was updated or the printing date. As a result, the latest version of the document can be reprinted even when the printer stores each version of the document.

Furthermore, in the abovementioned system, the printer stores the file name, the document data, and the document identification code during printing. Further, when the user requests a document list from the printer via a WEB browser or similar, the printer extracts a list consisting of the file names, document identification codes, passwords, and the printing date from the HDD 6, and prints these items in the form of a list. FIG. 34 is an explanatory view of the printed material of this print document list. By having this list at hand, the user is able to print a document from the corresponding printer anywhere.

In the embodiments described above, although the large capacity storage device was described as being a hard disk drive, another nonvolatile storage device such as an optical or magneto-optical disk drive or semiconductor memory can be used.

Further, although an electronic photocopier engine, namely a printer, was described, an engine with another print mechanism can be used.

Although the present invention was described by means of the embodiments hereinabove, the present invention permits a variety of modifications within the range of the technical purport of the present invention, these modifications not departing from the technological scope of the present invention.

INDUSTRIAL APPLICABILITY

As described hereinabove, according to the present invention, because, when the printer is instructed to perform printing, an identification number is automatically printed on the printed material and the print data is stored, where printed material that is printed with an identification number is concerned, even if the document creator is uncertain and does not know where the data is, anyone is able to easily print duplicates that are identical to the original document without any deterioration in quality without relying on a personal computer and an application, and so forth.

Moreover, it is possible to print duplicates by means of a simple operation that involves simply inputting an identification number via the printer operator panel, a host or a client, and therefore the same work can be performed more simply than by copying and in a short time, and more attractive printed material can be obtained.

In addition, because printing can be performed simply by means of an identification number from the host or a client, the time taken for the running of an application, a document opening operation, the opening of print data by means of a driver, and for the data transfer is shortened, whereby the work rate can be increased.

As described hereinabove, the effect of the present invention is that of making it possible to reduce to the largest extent the time interval occupied by futile work and to provide printed material anywhere that exhibits no deterioration in print quality.

What is claimed is:

1. A printer that receives data to be printed from a user and performs printing on a medium, the printer comprising:
   a printer engine that performs printing on the medium;
   a storage unit that stores print data on the basis of the received data together with an identification number; and
   a controller that determines the identification number for the received data, stores print data on the basis of the received data together with the identification number in the storage unit, retrieves the print data based on the identification number from the storage unit in response to designation of the identification number, and controls the printer engine to print the print data,
   wherein when the print data does not exits, a timeout process is performed.

2. The printer according to claim 1, wherein the controller determines the identification number for received data for which an assignment of the identification number is designated from outside, controls the printer engine to print the received data and the identification number, and stores print data on the basis of the received data together with the identification number in the storage unit.

3. The printer according to claim 1, wherein the controller determines the identification number from at least one of a device specific value and/or a serial number.

4. The printer according to claim 1, wherein the controller determines the identification number from at least one of a device specific value and the print data.

5. The printer according to claim 1, wherein the controller detects a fact that the print data corresponding with the identification number is not stored in the storage unit, issues an inquiry regarding print data that corresponds with the identification number to another network-connected device, and performs printing by acquiring the print data from the another device.

6. The printer according to claim 1, wherein the printer further comprises a Web server processing unit for a connection to the network.

7. A printer system, comprising:
   a host for transmitting data to be printed; and
   a printer that is connected to the host, receives the data and performs printing on a medium:
   the printer comprising:
   a printer engine that performs printing on the medium;
   a storage unit that stores print data on the basis of the received data, together with an identification number; and
   a controller that controls the printer engine to print the received data,
   wherein the controller determines the identification number for the received data in response to an instruction from the host, controls the printer engine to print the received data and the identification number, stores print data on the basis of the received data, together with the identification number in the storage unit, retrieves the print data of the identification number from the storage unit in response to designation of the identification number, and controls the printer engine to print the print data thus retrieved, wherein when the print data does not exist, timeout process is performed.

8. The printer system according to claim 7, wherein the host comprises a printer driver for designating assignment of the identification number.

9. The printer system according to claim 7, wherein the controller determines the identification number from a device specific value and a serial number.

10. The printer system according to claim 7, wherein the controller determines the identification number from a device specific value and the print data.

11. The printer system according to claim 7, wherein the controller of the printer detects a fact that the print data corresponding with the identification number is not stored in the storage unit, issues an inquiry regarding print data that corresponds with the identification number to another network-connected device, and performs printing by acquiring the print data from the another device.

12. The printer system according to claim 11, wherein the controller comprises a Web server processing unit for a connection to the network.

13. A method for controlling a printer that receives data to be printed and performs printing on a medium, comprising:

determining an identification number for the received data;

controlling a printer engine to print the received data and the identification number;

storing print data on the basis of the received data, together with the identification number in a storage unit;

retrieving the print data of the identification number from the storage unit in response to designation of the identification number;

controlling the printer engine to print the print data thus retrieve; and performing a timeout process when the print data does not exist.

14. The printer control method according to claim 13, wherein:

the process of storing determines the identification number for received data for which the assignment of the identification number is designated from outside, controls the printer engine to print the received data and the identification number, and stores print data on the basis of the received data, together with the identification number in the storage unit.

15. The printer control method according to claim 13, wherein the process of storing includes a process of determining the identification number from a device specific value and a serial number.

16. The printer control method according to claim 13, wherein the process of storing includes a process of determining the identification number from a device specific value and a print date.

17. The printer control method according to claim 13, further comprising:

detecting a fact that the print data corresponding with the identification number is not stored in the storage unit;

issuing an inquiry regarding print data that corresponds with the identification number to another network-connected device; and performing printing by acquiring the print data from the another device.

18. The printer control method according to claim 13, further comprising:

Web server processing for a connection to a network.

19. A storage medium that stores a program for controlling a printer that receives data to be printed and performs printing on a medium, comprising:

instructions for determining an identification number for the received data;

instructions for controlling a printer engine to print the received data and the identification number;

instructions for storing print data on the basis of the received data together with the identification number in a storage unit;

instructions for retrieving the print data of the identification number from the storage unit in response to designation of the identification number;

instructions for controlling the printer engine to print the print data thus retrieved; and instructions for performing a timeout process when the print data does not exist.

20. The printer according to claim 1, wherein whether or not the identification number is printed with the print data is decided by at least one of an instruction from the user and operating a printer.

21. The printer according to claim 1, further comprising:

a document management unit that judges whether or not space exists in the storage unit, wherein the print data is erased based on an oldest access date and time when no space exists.

22. A printer system comprising:

a user terminal that provides an instruction to print; and a printer that prints print data on a medium in response to the instruction, the printer comprising:

a printer engine that performs printing on the medium;

a storage unit that stores print data on the basis of received data together with an identification number;

a controller that determines the identification number for the received data, stores print data on the basis of the received data together with the identification number in the storage unit, retrieves the print data based on the identification number from the storage unit in response to designation of the identification number, and controls the printer engine to print the print data, wherein when the print data does not exist, a timeout process is performed, the identification number is printed with the print data based on a user instruction, and the user instruction is transmitted from at least one of the user terminal and a control panel of the pnnter, the printer further comprising:

a document management unit that judges whether or not space exists in the storage unit, wherein the print data is erased based on an oldest access date and time when no space exists in the storage unit.

23. The printer according to claim 1, wherein the duration of the timeout process is determined by a user.

* * * * *